(12) United States Patent
Sakurai

(10) Patent No.: US 8,396,299 B2
(45) Date of Patent: Mar. 12, 2013

(54) VANISHING POINT DETECTING SYSTEM, VANISHING POINT DETECTING METHOD, AND VANISHING POINT DETECTING PROGRAM

(75) Inventor: Kazuyuki Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 978 days.

(21) Appl. No.: 12/514,108

(22) PCT Filed: Nov. 6, 2007

(86) PCT No.: PCT/JP2007/071546
§ 371 (c)(1),
(2), (4) Date: May 8, 2009

(87) PCT Pub. No.: WO2008/056660
PCT Pub. Date: May 15, 2008

(65) Prior Publication Data
US 2010/0080467 A1    Apr. 1, 2010

(30) Foreign Application Priority Data

Nov. 8, 2006    (JP) .................................. 2006-302955

(51) Int. Cl.
*G06K 9/46* (2006.01)
(52) U.S. Cl. ........................................ 382/201; 382/199
(58) Field of Classification Search ........... 382/199–201
See application file for complete search history.

(56) References Cited

U.S. PATENT DOCUMENTS

| | | | | |
|---|---|---|---|---|
| 5,922,036 A | * | 7/1999 | Yasui et al. | 701/28 |
| 5,987,174 A | * | 11/1999 | Nakamura et al. | 382/199 |
| 6,111,993 A | * | 8/2000 | Matsunaga | 382/281 |
| 6,360,170 B1 | * | 3/2002 | Ishikawa et al. | 701/300 |
| 6,456,730 B1 | * | 9/2002 | Taniguchi | 382/107 |
| 6,546,118 B1 | * | 4/2003 | Iisaka et al. | 382/104 |
| 6,829,388 B1 | * | 12/2004 | Sakurai | 382/199 |
| 6,963,661 B1 | * | 11/2005 | Hattori et al. | 382/154 |
| 7,209,832 B2 | * | 4/2007 | Yamamoto et al. | 701/301 |
| 2003/0103650 A1 | * | 6/2003 | Otsuka et al. | 382/104 |
| 2005/0093824 A1 | * | 5/2005 | Hinckley et al. | 345/163 |
| 2005/0196034 A1 | * | 9/2005 | Hattori et al. | 382/154 |
| 2008/0037828 A1 | * | 2/2008 | Fujita | 382/104 |

FOREIGN PATENT DOCUMENTS

| | | |
|---|---|---|
| JP | 2000123300 A | 4/2000 |
| JP | 2003228711 A | 8/2003 |
| JP | 2005275500 A | 10/2005 |

OTHER PUBLICATIONS

International Search Report for PCT/JP2007/071546 mailed Dec. 11, 2007.
Supplementary European Search Report for EP 07 83 1278 issued Feb. 28, 2012.

(Continued)

*Primary Examiner* — Jingge Wu

(57) ABSTRACT

Disclosed is a vanishing point detecting system that includes a straight line detecting unit, a vanishing point detecting unit, and a vanishing point outputting unit. In the vanishing point detecting unit, a vanishing point is detected with one evaluation index of vanishing point plausibility being whether or not angles of plural straight lines passing through a point in question or a vicinity thereof are sparsely distributed over a relatively wide range.

28 Claims, 20 Drawing Sheets a. CASE IN WHICH ANGLES ARE DISPERSED b. CASE IN WHICH ANGLES ARE NOT DISPERSED

OTHER PUBLICATIONS

Chun-Che Wang et al., "Driver Assistance System for Lane Detection and Vehicle Recognition with Night Vision", 2005 IEEE/RSJ International Conference on Intelligent Robots and Systems, Aug. 2005.

P. L. Palmer et al., "Accurate Line Parameters from an Optimising Hough Transform for Vanishing Point Detection", Computer Vision, IEEE, 1993, pp. 529-533.

J. Hu et al., "Vanishing Hull", Proceedings of the Third International Symposium on 3D Data Proceeding, Visualization, and Transmission (3DPVT'06), IEEE, 2006.

C. J. Taylor, "A real-time approach to stereopsis and lane-finding", Intelligent Vehicles Symposium, IEEE, 1996, pp. 1-6.

Y. Wang et al., "Lane detection using spline model", Pattern Recognition Letters, vol. 21, 2000, pp. 677-689.

N. Simond et al., "Homography from a vanishing point in urban scenes", Proceedings of the 2003 IEEE/RSJ International Conference on Intelligent Robots and Systems, Oct. 2003, pp. 1005-1010.

G. F. Mclean et al., "Vanishing point detection by line clustering", 8180 IEEE Transactions on Pattern Analysis and Machine Intelligence, vol. 17, No. 11, Nov. 1995, pp. 1090-1095.

K. C. Kluge, "Performance evaluation of vision-based lane sensing: some preliminary tools, metrics, and results", Intelligent Transportation System, IEEE, Nov. 1997, pp. 723-728.

\* cited by examiner a. CASE IN WHICH ANGLES ARE DISPERSED b. CASE IN WHICH ANGLES ARE NOT DISPERSED

PITCH ANGLE

X-DIRECTION GRADIENT KERNEL

Y-DIRECTION GRADIENT KERNEL

VANISHING POINT DETECTING SYSTEM, VANISHING POINT DETECTING METHOD, AND VANISHING POINT DETECTING PROGRAM

CROSS-REFERENCE TO RELATED APPLICATIONS

This application is the National Phase of PCT/JP2007/071546, filed Nov. 6, 2007 which claims the benefit of the priority of Japanese patent application No. 2006-302955 filed on Nov. 8, 2006, the disclosure of which is incorporated herein in its entirety by reference thereto.

TECHNICAL FIELD

The present invention relates to a vanishing point detecting system, a vanishing point detecting method, and a vanishing point detecting program, and in particular, relates to a vanishing point detecting system, a vanishing point detecting method, and a vanishing point detecting program that enable a vanishing point to be robustly detected from an image containing noise.

BACKGROUND ART

FIG. 18 is a diagram showing a configuration of a conventional vanishing point detecting system as disclosed in Patent Document 1. Referring to FIG. 18, this conventional vanishing point detecting system includes a main control unit 1810, an image inputting unit 1820, an edge point detecting unit 1821, a line segment detecting unit 1822, a line segment selecting unit 1823, and a vanishing point estimating unit 1830. Operation of this conventional vanishing point detecting system is outlined below (for details, refer to a description in Patent Document 1).

The image inputting unit 1820 inputs an image that is a target for vanishing point detection.

The edge point detecting unit 1821 detects edge points in the image inputted to the image inputting unit 1820.

The line segment detecting unit 1822 detects line segments as consecutive point sequences of edge points detected by the edge point detecting unit 1821.

The line segment selecting unit 1823 selects line segments deemed to be effective in vanishing point estimation, among line segments detected by the line segment detecting unit 1822.

The vanishing point estimating unit 1830 estimates a vanishing point position from the line segments selected by the line segment selecting unit 1823.

Next, operation of the vanishing point estimating unit 1830 will be described below.

Since in general the vanishing point is defined as an intersection point of extensions of plural line segments, if consideration is given to positional relationships of the two end points of each line segment and a vanishing point, it is considered that ideally 3 points (the two end points of a line segment and the vanishing point) are on a line. At this time, the area of a triangle formed by the two ends of the line segment and the vanishing point is 0.

Consequently, as shown in FIG. 19, the sum for all line segments of areas 1930 formed by the two end points of each line segment 1920 and the vanishing point 1920 is obtained, and a position at which this sum of triangular areas is at a minimum is estimated to be the vanishing point position. This estimation calculation can be performed analytically.

[Patent Document 1]
JP Patent Kokai Publication No. JP-P2005-275500A

SUMMARY

The disclosure of the abovementioned Patent Document 1 is incorporated herein by reference thereto. An analysis is given below of related technology according to the present invention.

The abovementioned conventional vanishing point detecting system has a problem in being weak with regard to noise. That is, the conventional vanishing point detecting system cannot perform robust vanishing point detection. A reason for this is as follows.

As shown in FIG. 20, for example, when an inappropriate line segment 2020 that is not directed towards a vanishing point is included, a triangle with a large area is formed from the inappropriate line segment and the true vanishing point. Due to this effect, a position that deviates largely from the true position ends up being estimated as the vanishing point position.

Accordingly, it is an object of the present invention to provide a vanishing point detecting system, method, and program that can detect a vanishing point robustly.

The invention disclosed in the present application is configured in outline as follows, in order to solve the abovementioned problem.

A vanishing point detecting system according to the present invention includes a straight line detecting means (120), a vanishing point detecting means (130), and a vanishing point outputting means (140). In the vanishing point detecting means (130), a vanishing point is detected based on an evaluation index, which is an evaluation index of vanishing point plausibility, as to whether or not angles of a plurality of straight lines passing through a point in question or a vicinity thereof are sparsely distributed over a relatively wide range. Reference codes of component elements in parentheses are for facilitating understanding of a configuration of the present invention, and are not to be interpreted as limiting the invention.

In a first aspect of the present invention, there is provided a vanishing point detecting system including:

a straight line detecting means that detects a straight line from an image;

a means that calculates, for a point through which a plurality of straight lines pass or a vicinity of a point through which a plurality of straight lines pass, in the image, an evaluation value of the extent of variation of angles of the straight lines; and a means for detecting, as a vanishing point, a point at which, using the evaluation value of the extent of variation of angles of the straight lines that have been derived corresponding to the point through which the plurality of straight lines pass or the vicinity of the point through which the plurality of straight lines pass, as an index of vanishing point plausibility, the evaluation value of the extent of variation of angles of the straight lines has a relatively large value in comparison with an evaluation value of the extent of variation of angles of straight lines derived for other points.

In another aspect of the present invention, there is provided a vanishing point detecting system including:

a straight line detecting means that detects a straight line from an image;

a straight line angular variation evaluation value assigning means that assigns, for each point in a space including at least a portion of the image, when angles of straight lines that pass through the point or through a prescribed range surrounding the point are sparsely distributed over a relatively wide range, a straight line angular variation evaluation value having a larger value; and a vanishing point detecting means that detects, as a vanishing point, a point at which the straight line angular variation evaluation value has a relatively large value in comparison with others.

In another aspect of the present invention, there is provided a vanishing point detecting system including:

a straight line detecting means that detects straight lines from an image, and assigns for each of the straight lines detected, a confidence factor as a straight line;

a straight line angular variation evaluation value assigning means that assigns, for each point in a space including at least a portion of the image, when angles of straight lines that pass through the point or through a prescribed range surrounding the point are sparsely distributed over a relatively wide range, a straight line angular variation evaluation value having a larger value;

a vanishing point evaluation value assigning means that assigns, for each point in a space including at least a portion of the image, when a relatively large number of straight lines pass, based on a confidence factor for straight lines passing through the point or through a prescribed range surrounding the point, a vanishing point evaluation value having a larger value; and a vanishing point detecting means that detects, as a vanishing point, a point at which the vanishing point evaluation value has a relatively large value;

wherein when calculating the vanishing point evaluation value, the straight line angular variation evaluation value is taken into account.

In the present invention, the straight line detecting means detects a straight line by a Hough transform, and a voting value of the Hough transform of the straight line is used as a confidence factor for the straight line.

In the present invention, a statistical value concerning the angles of the straight lines is used as the straight line angular variation evaluation value. The statistical value concerning the angles of the straight lines includes at least one of: variance, standard deviation, difference between maximum value and minimum value and ratio of maximum value and minimum value, of the angles of the straight lines.

In the present invention, a confidence factor bias for the straight lines between a region to the right bottom of the point in question and a region to the left bottom may be used as the straight line angular variation evaluation value.

In the invention, the image includes image data obtained from an in-vehicle sensor, and a vanishing point with regard to a lane marker representing a driving lane and/or a road edge is detected as the vanishing point.

According to the present invention, there is provided a vehicle surrounding environment recognition system including the vanishing point detecting system of the present invention as described above, and calculates a positional relationship between a vehicle and the surrounding environment, based on a position of the vanishing point.

The vehicle surrounding environment recognition system according to the present invention calculates a pitch angle between a road surface and the direction in which the vehicle is heading, as the positional relationship of the vehicle and the surrounding environment.

According to one aspect of the present invention, there is provided a vanishing point detecting method comprising the steps of:

detecting a straight line from an image;

calculating, for a point through which a plurality of straight lines pass or a vicinity of a point through which a plurality of straight lines pass, in the image, an evaluation value of the extent of variation of angles of the straight lines; and detecting, as a vanishing point, a point at which, among points through which the plurality of straight lines pass or the vicinity of points through which the plurality of straight lines pass, the evaluation value of the extent of variation of angles of the straight lines derived corresponding to the points is relatively large in comparison with the evaluation value of the extent of variation of angles of the straight lines derived for other points.

According to another aspect of the present invention, there is provided a vanishing point detecting method comprising the steps of:

detecting a straight line from an image;

assigning, for each point in a space including at least a portion of the image, when angles of straight lines that pass through the point or through a prescribed range surrounding the point are sparsely distributed over a relatively wide range, a straight line angular variation evaluation value having a larger value; and detecting, as a vanishing point, a point at which the straight line angular variation evaluation value has a relatively large value.

According to another aspect of the present invention, there is provided a vanishing point detecting method comprising the steps of:

detecting a straight line from an image together with a confidence factor as a straight line;

assigning, for each point in a space including at least a portion of the image, when angles of straight lines that pass through the point or through a prescribed range surrounding the point are sparsely distributed over a relatively wide range, a straight line angular variation evaluation value having a larger value; and assigning, for each point in a space including at least a portion of the image, when a relatively large number of straight lines pass, based on a confidence factor for straight lines passing through the point or through a prescribed range surrounding the point, a vanishing point evaluation value having a larger value; and detecting, as a vanishing point, a point at which the vanishing point evaluation value has a relatively large value;

wherein when calculating the vanishing point evaluation value, the straight line angular variation evaluation value is taken into account.

In the vanishing point detecting method according to the present invention, in detecting the straight line from the image, the straight line is detected by a Hough transform, and a voting value of the Hough transform of the straight line is used as a confidence factor for the straight line.

In the vanishing point detecting method according to the present invention, a statistical value concerning the angles of the straight lines is used as the straight line angular variation evaluation value. The statistical value concerning the angles of the straight lines includes at least one among: variance, standard deviation, difference between maximum value and minimum value and ratio of maximum value and minimum value, of the angles of the straight lines.

In the vanishing point detecting method according to the present invention, a confidence factor bias for the straight lines between a region to the right bottom of the point in question and a region to the left bottom may be used as the straight line angular variation evaluation value.

In the vanishing point detecting method according to the present invention, image data obtained from an in-vehicle sensor is used as the image, and a vanishing point with regard to a lane marker representing a driving lane and/or a road edge is detected as the vanishing point.

A vehicle surrounding environment recognition method according to the present invention calculates a positional relationship between a vehicle and surrounding environment, based on a position of the vanishing point obtained by the vanishing point detecting method. A pitch angle between a road surface and the direction in which the vehicle is heading is calculated, as the positional relationship of the vehicle and the surrounding environment.

According to one aspect of the present invention, there is provided a computer program for causing a computer to execute the processing of:

detecting a straight line from an image;

calculating, for a point through which a plurality of straight lines pass or a vicinity of a point through which a plurality of straight lines pass, in the image, an evaluation value of the extent of variation of angles of the straight lines; and detecting, as a vanishing point, a point at which, using the evaluation value of the extent of variation of angles of the straight lines that have been derived corresponding to the point through which the plurality of straight lines pass or the vicinity of the point through which the plurality of straight lines pass, as an index of vanishing point plausibility, the evaluation value of the extent of variation of angles of the straight lines has a relatively large value compared to an evaluation value of the extent of variation of angles of straight lines derived for other points.

According to one aspect of the present invention, there is provided a computer program for causing a computer to execute:

a straight line detecting processing that detects a straight line from an image;

a straight line angular variation evaluation value assigning processing that assigns, for each point in a space including at least a portion of the image, when angles of straight lines that pass through the point or through a prescribed range surrounding the point are sparsely distributed over a relatively wide range, a straight line angular variation evaluation value having a larger value; and a vanishing point detecting processing that detects, as a vanishing point, a point at which the straight line angular variation evaluation value has a relatively large value.

According to another aspect of the present invention, there is provided a computer program for causing a computer to execute:

a straight line detecting processing that detects a straight line from an image together with a confidence factor as a straight line;

a straight line angular variation evaluation value assigning processing that assigns, for each point in a space including at least a portion of the image, when angles of straight lines that pass through the point or through a prescribed range surrounding the point are sparsely distributed over a relatively wide range, a straight line angular variation evaluation value having a larger value;

a vanishing point evaluation value assigning processing that assigns, for each point in a space including at least a portion of the image, when a relatively large number of straight lines pass, based on a confidence factor for straight lines passing through the point or through a prescribed range surrounding the point, a vanishing point evaluation value having a larger value, the straight line angular variation evaluation value being taken into account, when calculating the vanishing point evaluation value; and a vanishing point detecting processing that detects, as a vanishing point, a point at which the vanishing point evaluation value has a relatively large value.

In the program according to the present invention, in the straight line detecting processing, the straight line is detected by a Hough transform, and a voting value of the Hough transform of the straight line is used as a confidence factor for the straight line.

In the program according to the present invention, a statistical value concerning the angles of the straight lines is used as the straight line angular variation evaluation value. The statistical value concerning the angles of the straight lines includes at least one of: variance, standard deviation, difference between maximum value and minimum value and ratio of maximum value and minimum value, of the angles of the straight lines.

In the program according to the present invention, a confidence factor bias for the straight lines between a region to the right bottom of the point in question and a region to the left bottom is used as the straight line angular variation evaluation value.

In the program according to the present invention, data obtained from an in-vehicle sensor is used as the image, and a vanishing point with regard to a lane marker representing a driving lane and/or a road edge is detected as the vanishing point.

In the program according to the present invention, the computer may be caused to execute a processing of calculating the positional relationship of the vehicle and the surrounding environment, based on the position of the vanishing point, and to perform recognition of the environment surrounding the vehicle.

In the program according to the present invention, a pitch angle between the road surface and the direction in which the vehicle is headed, as the positional relationship of the vehicle and the surrounding environment may be calculated.

According to the present invention, with regard to each point in a two dimensional space including at least a portion of an image, by detecting, as the vanishing point, a point at which angles of a plurality of straight lines passing through the point or a vicinity thereof are sparsely distributed and dispersed over a wide range, robust detection of the vanishing point is realized. A reason for this is that the more the angles of the plurality of straight lines passing through a prescribed range surrounding the point in question are sparsely distributed and dispersed, the more likely it is that the point in question is detected as a vanishing point, thereby suppressing detection of a false vanishing point.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Next, a detailed description will be given concerning preferred modes for carrying out the invention, with reference to the drawings.

As described above, when a vanishing point other than a point at infinity is detected, particularly in a typical method of detecting a straight line, such as the Hough transform (a method of detecting a parameter curve in an image), with regard to detection of the straight line, false straight lines, for which angle and position resemble the straight lines which are to be detected, are likely be detected, and an intersection point (false vanishing point) formed by the false straight lines is likely to be detected in error as the vanishing point. The present invention enables a true vanishing point to be robustly detected against the false vanishing point due to the false straight lines. With regard to each point in a two dimensional space including at least a portion of the image, if angles of a plurality of straight lines that pass through the point or through a vicinity of the point are sparsely distributed and dispersed over a relatively wide range, the point is detected as a vanishing point. This is because, with regard to each point in the two dimensional space including at least a portion of the image, the more the angles of the plurality of straight lines passing through the point in question or a prescribed range surrounding the point in question are sparsely distributed and dispersed over a relatively wide range, the more the point in question is likely to be detected as the vanishing point, and hence detection of a false vanishing point is suppressed.

Figure 1:
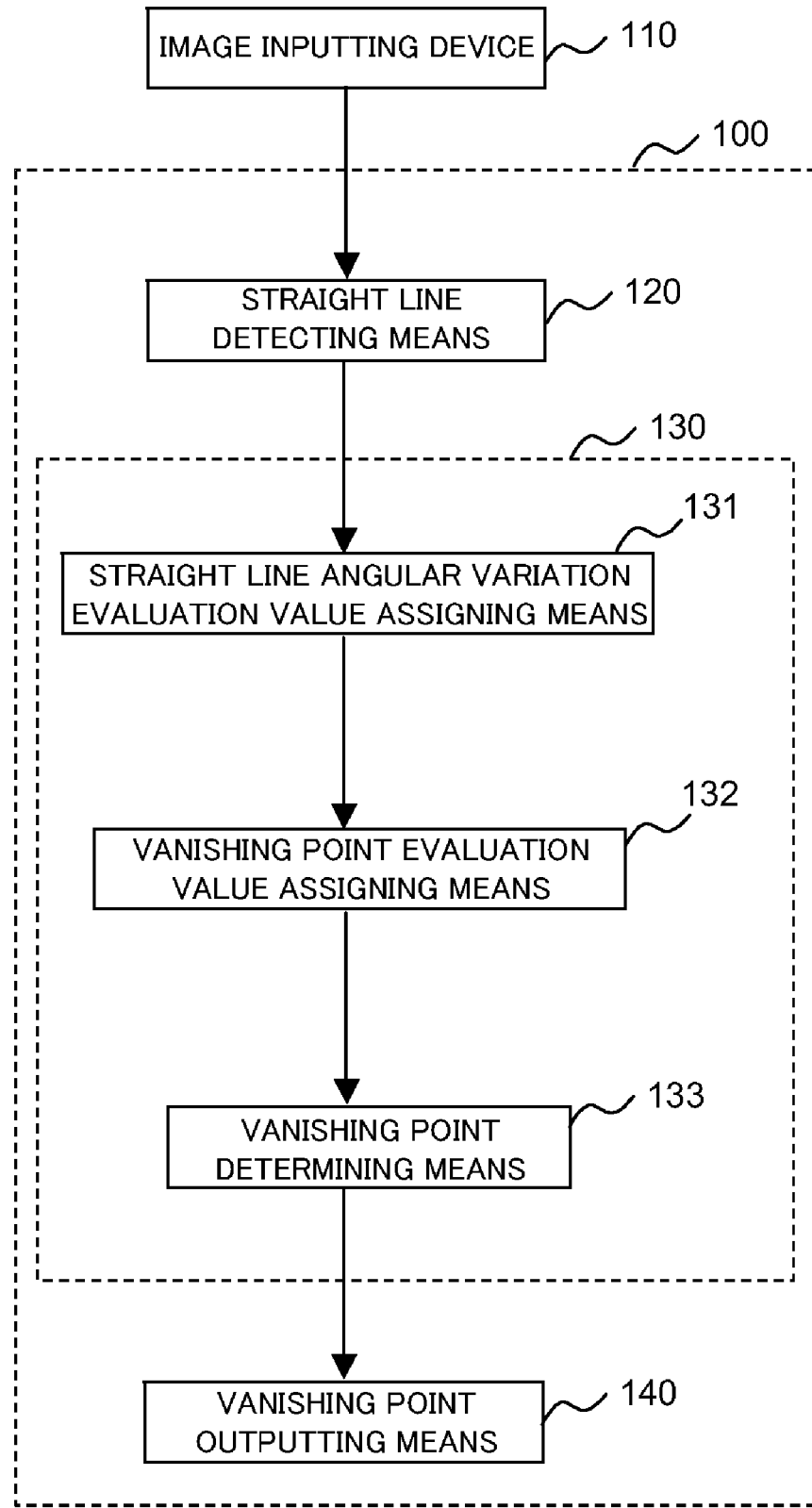
FIG. 1 is a diagram showing a configuration of a first exemplary embodiment of the present invention.

FIG. 1 is a diagram showing a configuration of a first exemplary embodiment of the present invention. Referring to FIG. 1, a system of the first exemplary embodiment of the invention includes a computer (central processing unit, processor, or data processing unit) 100 that operates by program control, and an image inputting device 110.

In the system of the present exemplary embodiment, the computer (central processing unit, processor, and data processing unit) 100 includes a straight line detecting means (unit) 120, a vanishing point detecting means (unit) 130, and a vanishing point outputting means (unit) 140.

The vanishing point detecting means 130 includes a straight line angular variation evaluation value assigning means (unit) 131, a vanishing point evaluation value assigning means (unit) 132, and a vanishing point determining means (unit) 133. Each of these means operate in outline as follows.

The image inputting device 110 inputs an image that is to be subjected to vanishing point detection.

The straight line detecting means 120 detects plural straight lines, from the image inputted by the image inputting device 110, which are supposed to pass through the vanishing point.

The straight line angular variation evaluation value assigning means 131, for each point in a two dimensional space (below, referred to as a "straight line voting space"), which includes at least a portion of the image, assigns an evaluation value (referred to below as a "straight line angular variation evaluation value") that evaluates the extent of variation of angles of the straight lines that pass through the point or a prescribed range surrounding the point.

The vanishing point evaluation value assigning means 132, with regard to each of points in the straight line voting space, assigns to each in the space, an evaluation value (referred to below as a "vanishing point evaluation value") that evaluates the extent of plausibility of the point in question as a vanishing point, from (a) information concerning the straight lines that pass through the point in question or a prescribed range surrounding the point in question, and (b) a straight line angular variation evaluation value.

The vanishing point evaluation value assigning means 132 may be omitted, according to circumstances and in such a case, the straight line variation evaluation value obtained by the straight line angular variation evaluation value assigning means 131 is used, as it is, as the vanishing point evaluation value.

The vanishing point determining means 133 uses the vanishing point evaluation value assigned to each point in the straight line voting space to determine the vanishing point.

The vanishing point outputting means 140 outputs the vanishing point determined by the vanishing point determining means 133.

A description will be given concerning the extent of variation of the angles.

Figure 2A:
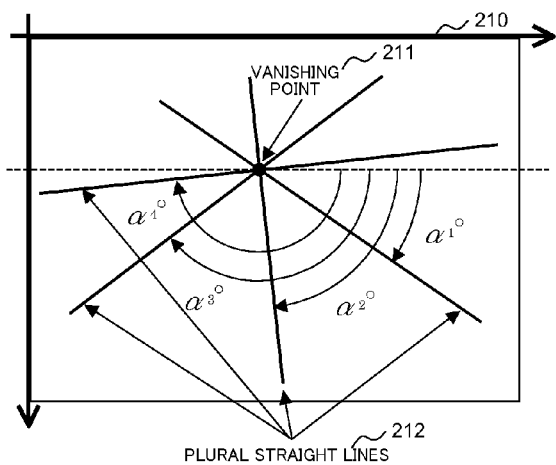
FIGS. 2A and 2B describe variation of straight line angles.
Figure 2B:
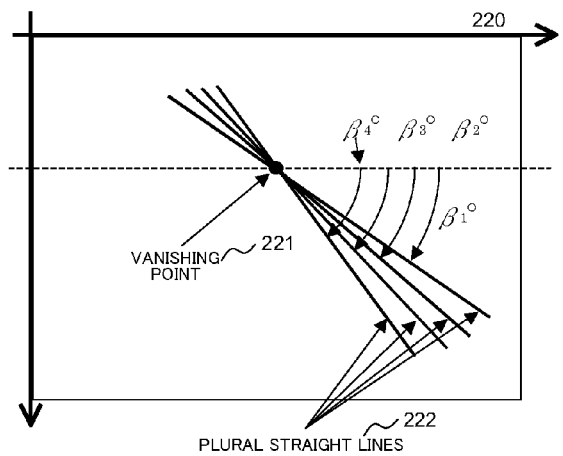

FIGS. 2A and 2B are diagrams illustrating the present exemplary embodiment. FIG. 2A shows a case in which the angles of a plurality of straight lines passing through the vanishing point in the image are dispersed, and FIG. 2B shows a case in which the angles are not dispersed.

In the case in which the angles are dispersed, as shown in FIG. 2A, angles α1, α2, α3, and α4 of respective straight lines 212 which pass through the vanishing point 211 in the image 210, with respect to a horizontal line, are sparsely distributed in a relatively wide range.

On the other hand, in the case in which the angles are not dispersed, as shown in FIG. 2B, the angles β1, β2, β3, and β4 of respective straight lines 222 which pass through the vanishing point 221 in the image 220, with respect to a horizontal line, are densely distributed in a relatively narrow range.

The extent of variation of the angles indicates the variation of the angles of this type of plurality of straight lines.

In the present exemplary embodiment, for each point in the image, the angular variation evaluation value is designed such that the value increases when the angles are dispersed, as in FIG. 2A, and the value decreases when the angles are not dispersed, as in FIG. 2B.

Figure 3:
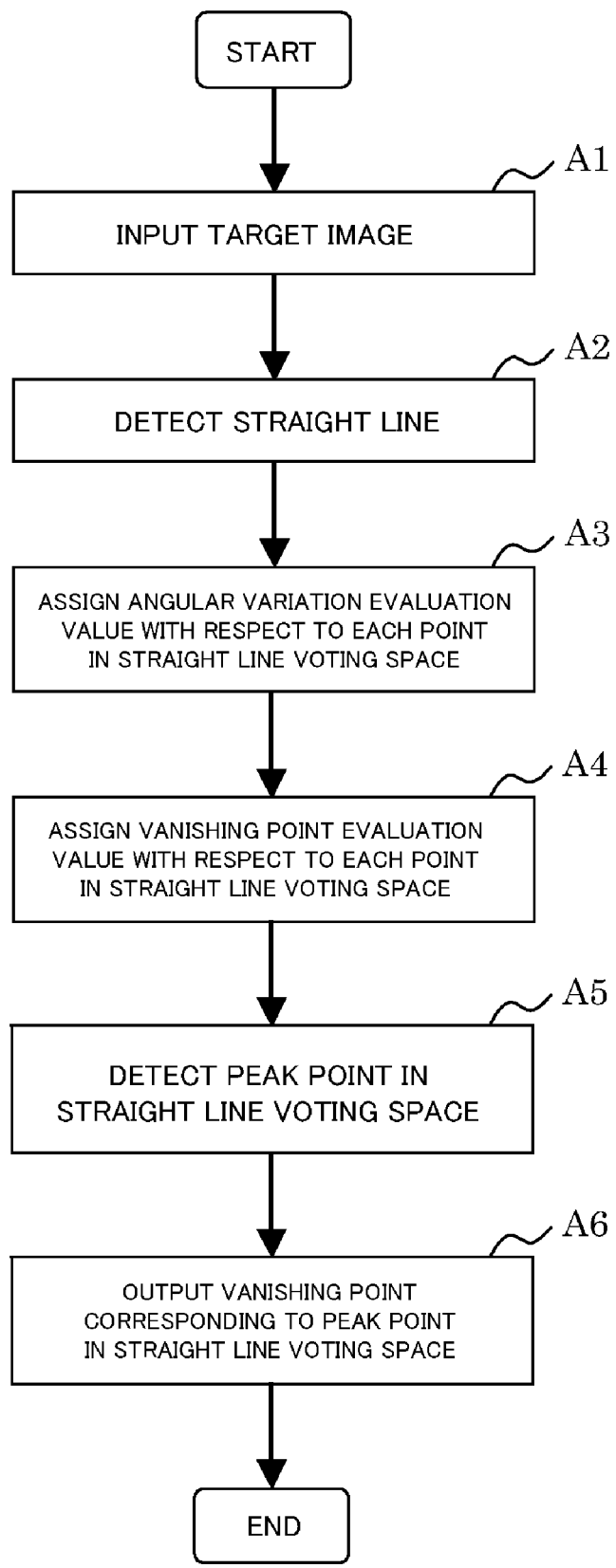
FIG. 3 is a flowchart for describing operation of the first exemplary embodiment of the present invention.

FIG. 3 is a flowchart for describing operation of the first exemplary embodiment. Referring to FIG. 1 and FIG. 3, a detailed description of overall operation of the present exemplary embodiment will be described.

The image inputting device 110 inputs the image that is a target for vanishing point detection (step A1 in FIG. 3). The image inputting device 110 stores image data (digital image data) in a storage device not shown.

The straight line detecting means 120 detects a plurality of straight lines, from the image inputted by the image inputting device 110, which are presumed to pass through the vanishing point (step A2).

The straight line angular variation evaluation value assigning means 131 assigns, to each point in the straight line voting space, the angular variation evaluation value for the plurality of straight lines that pass through the point or a prescribed range surrounding the point (step A3).

The vanishing point evaluation value assigning means 132 assigns, to each point in the straight line voting space, a vanishing point evaluation value, from information concerning the plurality of straight lines that pass through the point or a prescribed range surrounding the point, and from the straight line angular variation evaluation value (step A4). However, step A4 may be omitted, and the straight line angular variation evaluation value may be used as the vanishing point evaluation value, as described previously.

The vanishing point determining means 133, by using the vanishing point evaluation value assigned to each point in the straight line voting space to determine, as the vanishing point, a point to which the maximum vanishing point evaluation value has been assigned, for example, detects the vanishing point (step A5). The vanishing point determining means 133 is not limited to the configuration in which the point to which the maximum vanishing point evaluation value is assigned is taken as the vanishing point, and any other approach may as a matter of course be adopted. For example, by taking a point which gives a maximal value (extreme value) of the vanishing point evaluation value as the vanishing point, it is possible to detect the vanishing point.

The vanishing point outputting means 140 outputs a vanishing point detected by the vanishing point determining means 133 (step A6).

An operational effect of the present exemplary embodiment will now be described.

In the present exemplary embodiment, the configuration is such that with regard to each point in the straight line voting space, the larger the extent of variation of the angles of the plurality of straight lines passing through the point or through a prescribed range surrounding the point, the more likely it is to detect the point a vanishing point. As a result, when detecting a vanishing point other than an infinity point, in particular, it is made possible to robustly detect a true vanishing point, against false vanishing points, under the condition in which with regard to detection of the straight lines, false straight lines, for which angle and position resemble the authentic straight lines that should be detected, are apt to be detected, and intersection points formed by the false straight lines are apt to be detected in error as vanishing points (as described before, this type of false straight line may be detected in a typical straight line detection approach such as the Hough transform, for example). Below a description will be given using specific examples.

EXAMPLE 1

Figure 4:
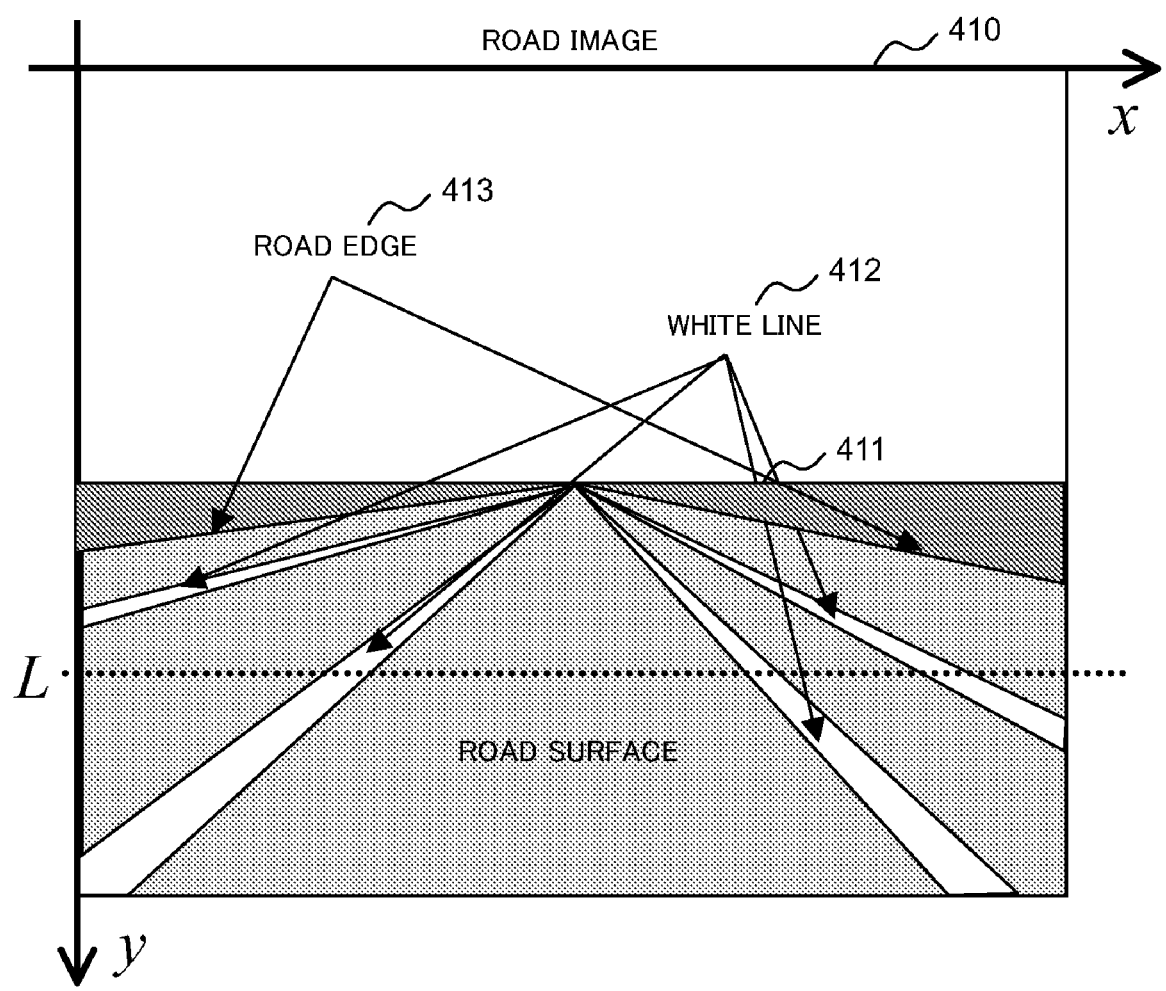
FIG. 4 is a diagram showing a road image using one example of the present invention.
Figure 5A:
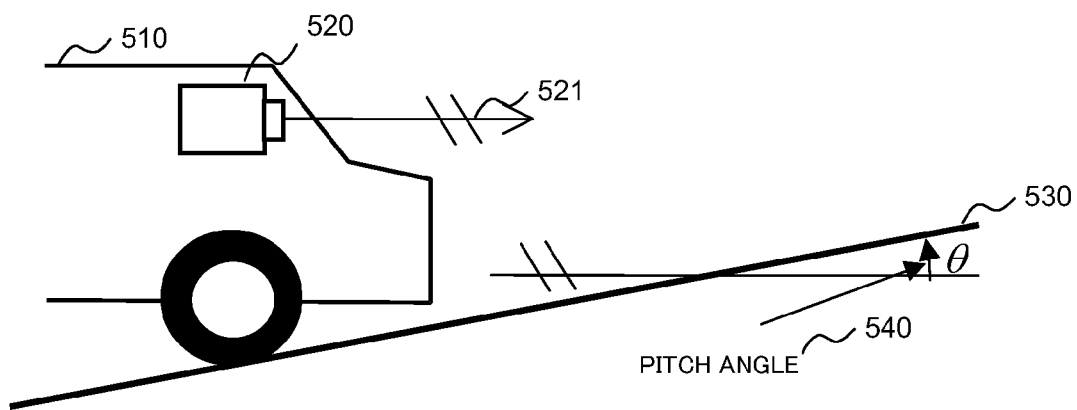
FIGS. 5A and 5B are diagrams showing a camera setting and a camera coordinate system in one example of the present invention.
Figure 5B:
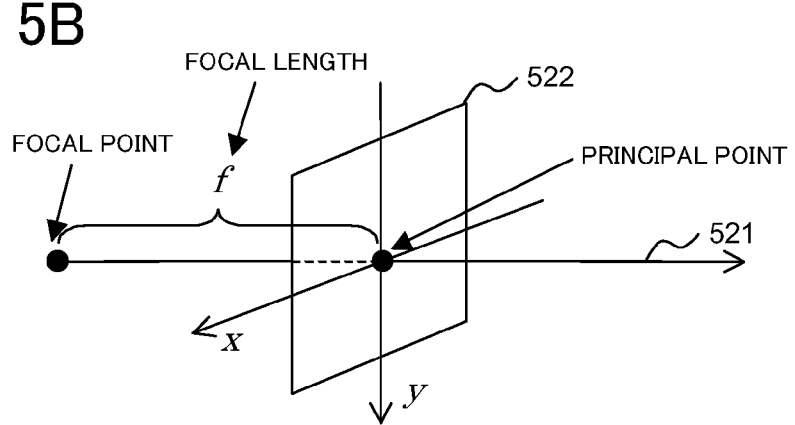

FIG. 4, FIGS. 5A and 5B are diagrams describing a specific example (one example) in which the present invention is carried out. FIG. 4 is an image taken of a road in a forward direction from an in-vehicle camera. That is, white lines 412 representing driving lanes and edge portions of the road edges 413 are detected as straight lines by the Hough transform, from a road image 410 obtained by taking an image of the road from a camera 520 installed in a vehicle 510, in FIG. 5A, and a vanishing point formed by these straight lines is detected. In FIG. 5A, a pitch angle θ is an angle between the vehicle 510 and the road surface 530 (the pitch angle θ is described later). FIG. 5B schematically illustrates relationships (an optical system) of a camera-optical axis 521 of the camera 520 installed in the vehicle 510 of FIG. 5A, a camera-image plane 522, a focal point and a focal length (FIG. 5B is described later).

Figure 6A:
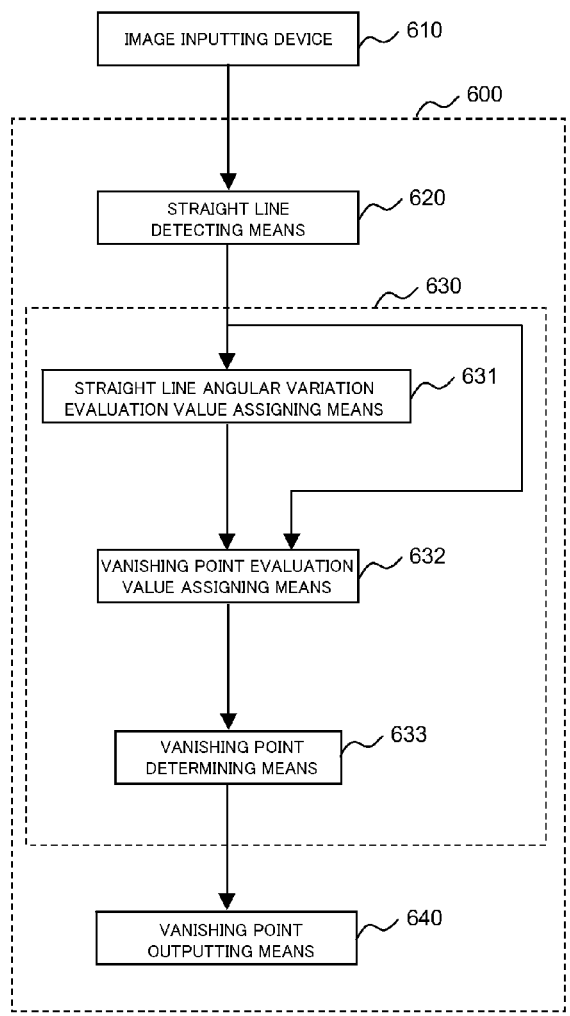
FIGS. 6A and 6B are diagrams showing configurations of one example of the present invention.
Figure 6B:
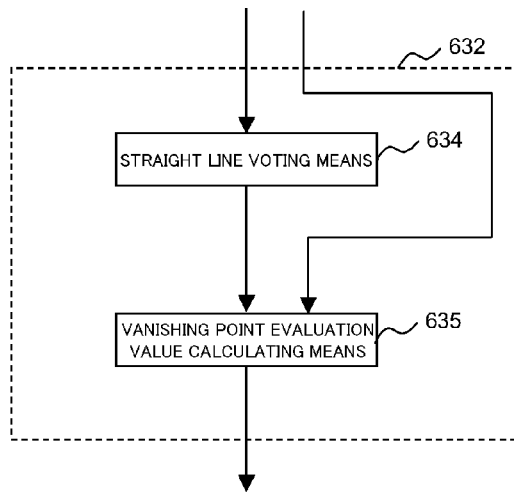

FIG. 6A is a diagram showing one example of a configuration of the present example. FIG. 6B is a diagram showing one example of a configuration of the vanishing point detecting means 630 of FIG. 6A. Referring to FIG. 6A, the present example includes an image inputting device 610 that includes an in-vehicle camera, a straight line detecting means (unit) 620, a vanishing point detecting means (unit) 630, and a vanishing point outputting means (unit) 640.

Referring to FIG. 6A, the vanishing point detecting means 630 includes a straight line angular variation evaluation value assigning means (unit) 631, a vanishing point evaluation value assigning means (unit) 632, and a vanishing point determining means (unit) 633.

Referring to FIG. 6B, the vanishing point evaluation value assigning means 632 includes a straight line voting means (unit) 634, and a vanishing point evaluation value calculating means (unit) 635.

Figure 7A:
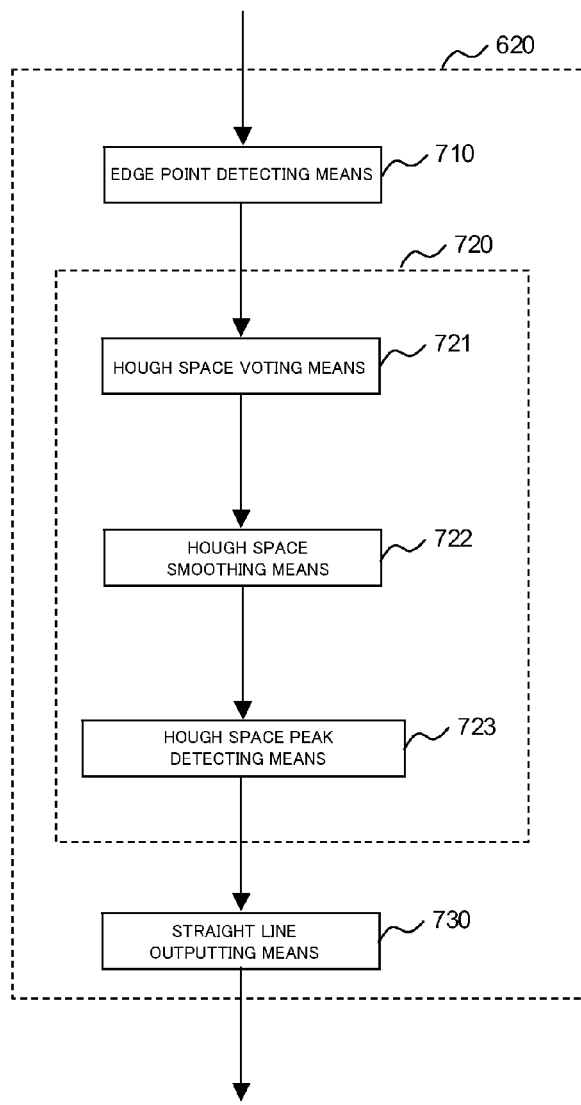
FIGS. 7A and 7B are diagrams showing configurations of one example of the present invention.
Figure 7B:
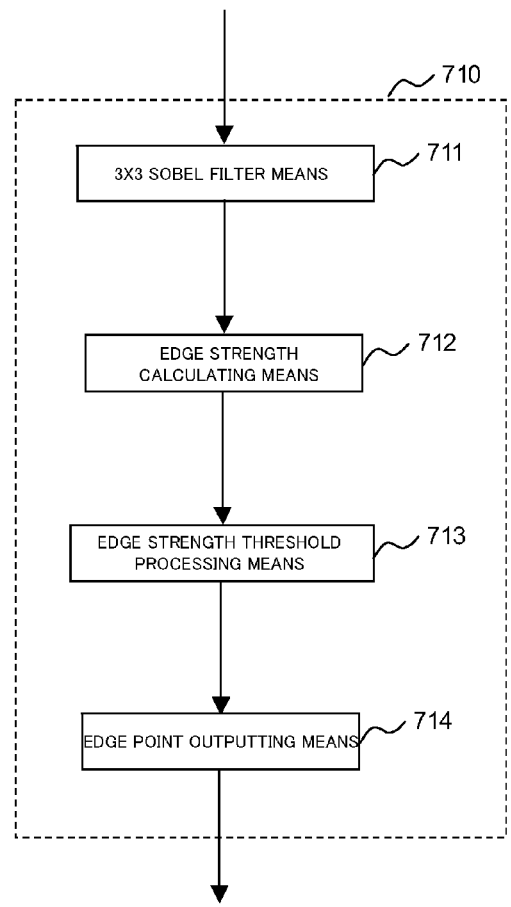

FIG. 7A is a diagram showing one example of a configuration of the straight line detecting means 620 of FIG. 6A. FIG. 7B is a diagram showing one example of a configuration of an edge point detecting means 710 of FIG. 7A.

Referring to FIG. 7A, the edge point detecting means 710, a Hough transform means (unit) 720, and a straight line outputting means (unit) 730 are included.

Referring to FIG. 7B, the edge point detecting means 710 includes a 3×3 Sobel filter means (unit) 711, an edge strength calculating means (unit) 712, an edge strength threshold processing means (unit) 713, and an edge point outputting means (unit) 714.

It should be noted that the edge point detecting means 710 is not limited to the abovementioned configuration, and as long as it is possible to detect points of an edge portion (referred to as "edge points") at which there is a steep change of pixel values, any configuration can be used.

Referring to FIG. 7A, the Hough transform means 720 includes a Hough space voting means 721, a Hough space smoothing means 722, and a Hough space peak detecting means 723.

The image inputting device 610 of FIG. 6A inputs the road image 410 shown in FIG. 4.

The straight line detecting means 620 of FIG. 6A detects, as straight lines, the white lines 412 representing driving lanes, the edges 413, and the like, (refer to FIG. 4), by the Hough transform, from the road image 410 (refer to FIG. 4) inputted by the image inputting device 610.

The vanishing point detecting means 630 of FIG. 6A detects a point at which the straight lines detected by the straight line detecting means 620 concentrates, as the vanishing point.

The vanishing point outputting means 640 outputs the vanishing point.

Figure 8A:
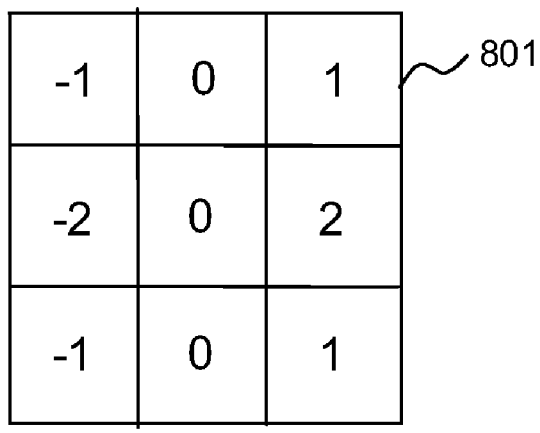
FIGS. 8A and 8B are diagrams describing a Sobel filter.
Figure 8B:
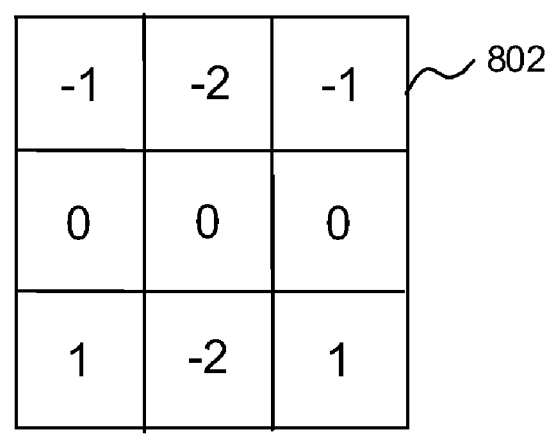

The 3×3 Sobel filter means 711 of FIG. 7B obtains the sum of the product of each coefficient of an x-direction gradient kernel 801 and a y-direction gradient kernel 802 shown in FIG. 8A and FIG. 8B, and each pixel value in a 3×3 vicinity for each point in the road image 410 (refer to FIG. 4). The product sums of these are respectively referred to as "Sobel x-component" and "Sobel y-component".

The edge strength calculating means 712 of FIG. 7B calculates the square of the sum of squares or sum of absolute values of the Sobel x-component and the Sobel y-component, for each point in the road image 410 (refer to FIG. 4), and obtains the edge strength of each point.

The edge strength threshold processing means 713 of FIG. 7B determines whether or not the edge strength for each point in the road image 410 (refer to FIG. 4) is greater than or equal to a threshold determined in advance, for example, 100.

The edge point outputting means 714 of FIG. 7B outputs, as an edge point, a point at which the edge strength is determined to be greater than or equal to the threshold, by the edge strength threshold processing means 713.

The Hough space voting means 712 of FIG. 7A votes for a weighting corresponding to the edge point, for each point on a track corresponding to edge points detected by the edge point detecting means 710, in a space (referred to below as Hough space) that has parameters representing straight lines as axes.

Voting takes place for the edge strength as the weighting corresponding to the edge points. However, the weighting corresponding to the edge points is not limited to the edge strength, and, for example, a constant, an angle formed by a gradient of pixel values for edge points calculated from the Sobel x-component and the Sobel y-component, described later, and a gradient of a straight line corresponding to points on the track, a value calculated from pixel values of edge points or vicinities thereof, or a value calculated from these values (values calculated from pixel values and the like of edge points or vicinities thereof) or edge strength or the like, may be used.

The Hough space smoothing means 722 of FIG. 7A uses, for each point in the Hough space, a voting value (referred to below as a "straight line voting value") of the point or a point in a vicinity thereof to determine a straight line voting value that has been smoothed at the point in question.

Although there is no particular limitation imposed on the present invention, in the present example, the straight line voting value that has been smoothed is determined as an average value of points in a 3×3 vicinity of the point in question, for example. A method of determining a vicinity range and the straight line voting value that has been smoothed is not limited to this. According to the case, the Hough space smoothing means 722 of FIG. 7A may be omitted.

The Hough space peak detecting means 723 of FIG. 7A detects, as a peak, a point that is greater than or equal to the threshold determined in advance in the Hough space, and that has a maximum straight line voting value in the 3×3 vicinity range or the like, for example. However, a reference for detecting a peak is not limited to this, and a reference corresponding to a problem setting is possible, such as taking, as a peak, only a point having the maximum straight line voting value in the Hough space.

The straight line angular variation evaluation value assigning means 631 of FIG. 6A calculates and assigns a straight line angular variation evaluation value for each point in a two dimensional space (referred to below as a "straight line voting space") including at least a portion of the road image 410.

In addition, the vanishing point evaluation value assigning means 632 of FIG. 6A, with regard to each point in the straight line voting space, calculates and assigns a vanishing point evaluation value for each point in the road image 410 (refer to FIG. 4) or the straight line voting space, from information of the plurality of straight lines detected by the straight line detecting means 620, and from the straight line angular variation evaluation value assigned to each point in the road image 410 (refer to FIG. 4) or the straight line voting space, by the vanishing point evaluation value assigning means 632 of FIG. 6A.

Although there is no particular limitation imposed on the present invention, the vanishing point determining means 633 of FIG. 6A, determines, as the vanishing point, a point at which the vanishing point evaluation value is at a maximum in the straight line voting space.

A reference for the vanishing point determination is not limited to a point at which a vanishing point evaluation value is at a maximum in the straight line voting space, and the reference may be made in accordance with the problem setting, such as, a point having a vanishing point evaluation value greater than or equal to a threshold determined in advance, or a point having a maximal value in a vicinity determined in advance, or a combination of these conditions.

Figure 9:
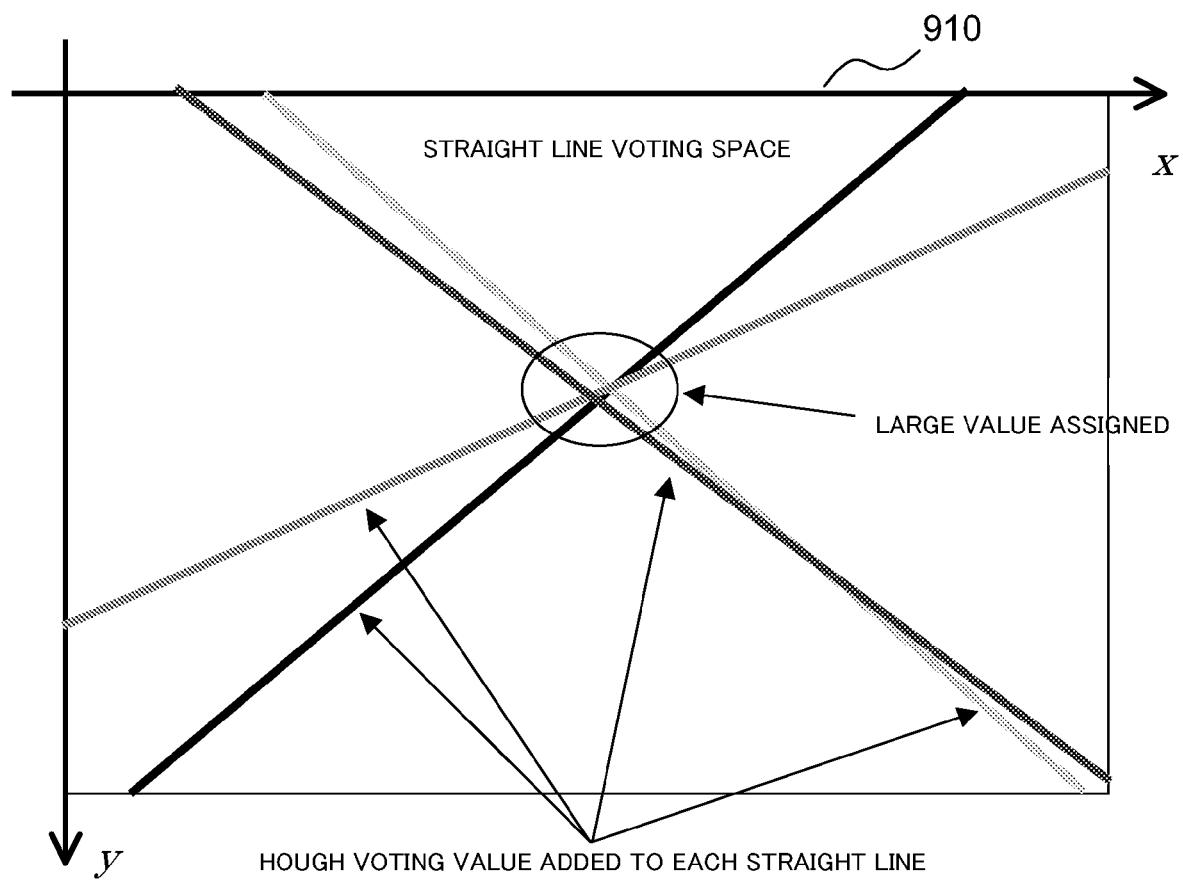
FIG. 9 is a diagram describing straight line voting processing in one example of the present invention.

The straight line voting means 634 of FIG. 6B, as shown in FIG. 9, makes a vote (referred to below as "vanishing point voting value") of a straight line voting value for a peak detected by the Hough space peak detecting means 723, for example, for a point in the straight line voting space corresponding to a point on the track of each straight line detected by the Hough transform means 720 of FIG. 7A.

The voting value used by the straight line voting means 634 of FIG. 6B is not limited to the above description, and a voting value may be used such that the more definite it is that a point is on a straight line, the larger its value is.

The vanishing point evaluation value calculating means 635 of FIG. 6B calculates, for each point in the straight line voting space, a vanishing point evaluation value as, for example, the product of the vanishing point voting value and the straight line angular variation evaluation value with regard to the point or a point in a vicinity thereof, and assigns the vanishing point evaluation value to the point.

With regard to the vanishing point evaluation value calculating means 635, the method of calculating the vanishing point evaluation value is not limited to this, and any calculation method in which there is provided a monotonic increase of the vanishing point voting value and the straight line angular variation evaluation value may be used.

The straight line angular variation evaluation value will now be described.

As described above, the straight line angular variation evaluation value is calculated such that the more dispersed the angles of the straight lines passing through the point in question or a prescribed range surrounding the point in question are, the large its value is.

Here, an "angle" is, for example, an angle of each straight line with respect to a horizontal line, and variation indicates a state in which angles of the straight lines are sparsely distributed in a wide range.

It is assumed that the number of straight lines passing through a point in the road image 410 (refer to FIG. 4) or in the straight line voting space, or surroundings thereof is N, and the straight lines are L1, L2, . . . and LN.

An angle formed with horizontal lines, by straight lines Lk, k=1, 2, . . . N, and a voting value in the Hough transform means are αk and wk, respectively.

Here, it is possible to calculate the straight line variation evaluation values as variance values such as a variance of αk:

$$\frac{1}{N}\sum_{k=1}^{N}(\alpha_k - \overline{\alpha})^2, \text{ where } \overline{\alpha} = \frac{1}{N}\sum_{k=1}^{n}\alpha_k \qquad (1)$$

or a weighting variance of αk:

$$\frac{1}{N}\sum_{k=1}^{N}(\alpha_k - \overline{\alpha})^2, \text{ where } \overline{\alpha} = \frac{1}{N}\sum_{k=1}^{n}w_k\alpha_k \qquad (2)$$

or standard deviation, obtained by taking square roots thereof, or difference of maximum value and minimum value of αk:

$$\max_k \alpha_k - \min_k \alpha_k \qquad (3)$$

It should be noted that the straight line variation evaluation value is not limited to this, and may be such that the more dispersed the angles of the straight lines passing through the point in question or a prescribed range surrounding the point in question are, the large its value is.

The operation of the present example will be described in detail with reference to flows chart of FIGS. 6A, 6B, 7A, 7B, and 10.

Figure 10:
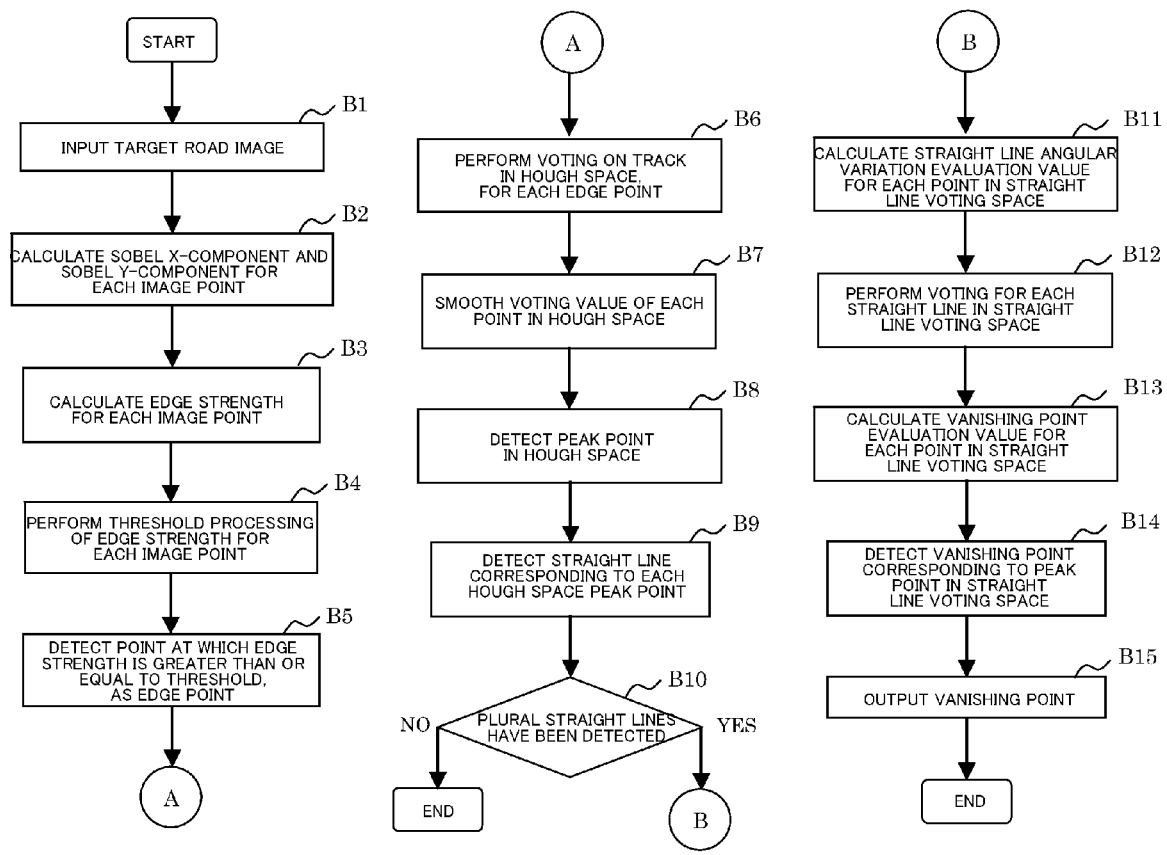
FIG. 10 is a flowchart for describing operation in one example of the present invention.

The image inputting device 610 of FIG. 6A inputs the road image (step B1 in FIG. 10).

Next, the 3×3 Sobel filter means 711 of FIG. 7B calculates the Sobel x-component and the Sobel y-component, for each point in the road image 410 (refer to FIG. 4) (step B2).

Next, the edge strength calculating means 712 of FIG. 7B calculates the edge strength of various points in the road image (step B3).

Next, the edge strength threshold processing means 713 of FIG. 7B performs threshold processing of edge strength for each point in the road image (step B4).

Next, the edge point outputting means 714 of FIG. 7B detects, as an edge point, a point at which the edge strength is greater than or equal to a threshold (step B5).

Next, the Hough space voting means 721 of FIG. 7A performs voting on a track in the Hough space for each edge point (step B6).

Next, the Hough space smoothing means 722 of FIG. 7A smoothes voting values of each point in the Hough space (step B7).

Next, the Hough space peak detecting means 723 of FIG. 7A detects a peak point in the Hough space (step B8).

Next, the straight line outputting means 730 of FIG. 7A detects a straight line corresponding to each Hough space peak point (step B9).

Here, if plural straight lines are detected, flow proceeds to step B11, and if plural straight lines are not detected, the flow ends (step B10).

Next, the straight line angular variation evaluation value assigning means 631 of FIG. 6A calculates a straight line angular variation evaluation value for each point of the straight line voting space (step B11).

Next, the straight line voting means 634 of FIG. 6B votes with a straight line voting value of a peak detected by the Hough space peak detecting means 723, for example, at a point in the straight line voting space corresponding to a point on a track of each straight line detected by the Hough transform means 720 of FIG. 7A step B12).

Next, the vanishing point evaluation value calculating means 635 of FIG. 6B calculates a vanishing point evaluation value for each point in the straight line voting space as, for example, the product of the vanishing point voting value and the straight line angular variation evaluation value (step B13).

Next, the vanishing point determining means 633 of FIG. 6A detects a vanishing point corresponding to a peak point of the vanishing point voting values in the straight line voting space (step B14).

Next, the vanishing point outputting means 640 of FIG. 6A outputs a vanishing point detected by the vanishing point determining means 633 (step B15).

As an application example of the present example, it is possible to calculate a pitch angle (θ) 540 between the vehicle 510 and the road surface 530, as shown in FIG. 5A.

That is, as shown in FIG. 5B, with a known focal length f for the camera image plane 522 and a camera coordinate system (x, y), and with coordinates of the vanishing point as (xv, yv), the pitch angle (θ) 540 is determined as in equation (4). From yv=−f cos(θ), we have:

$$\theta = \arccos\left(-\frac{y_v}{f}\right) \qquad (4)$$

The calculation of the pitch angle θ is not limited to equation (4), and any calculation method which approximately calculates the equation (4) may be used.

Next, a second exemplary embodiment of the present invention will be described with reference to the drawings.

Figure 11:
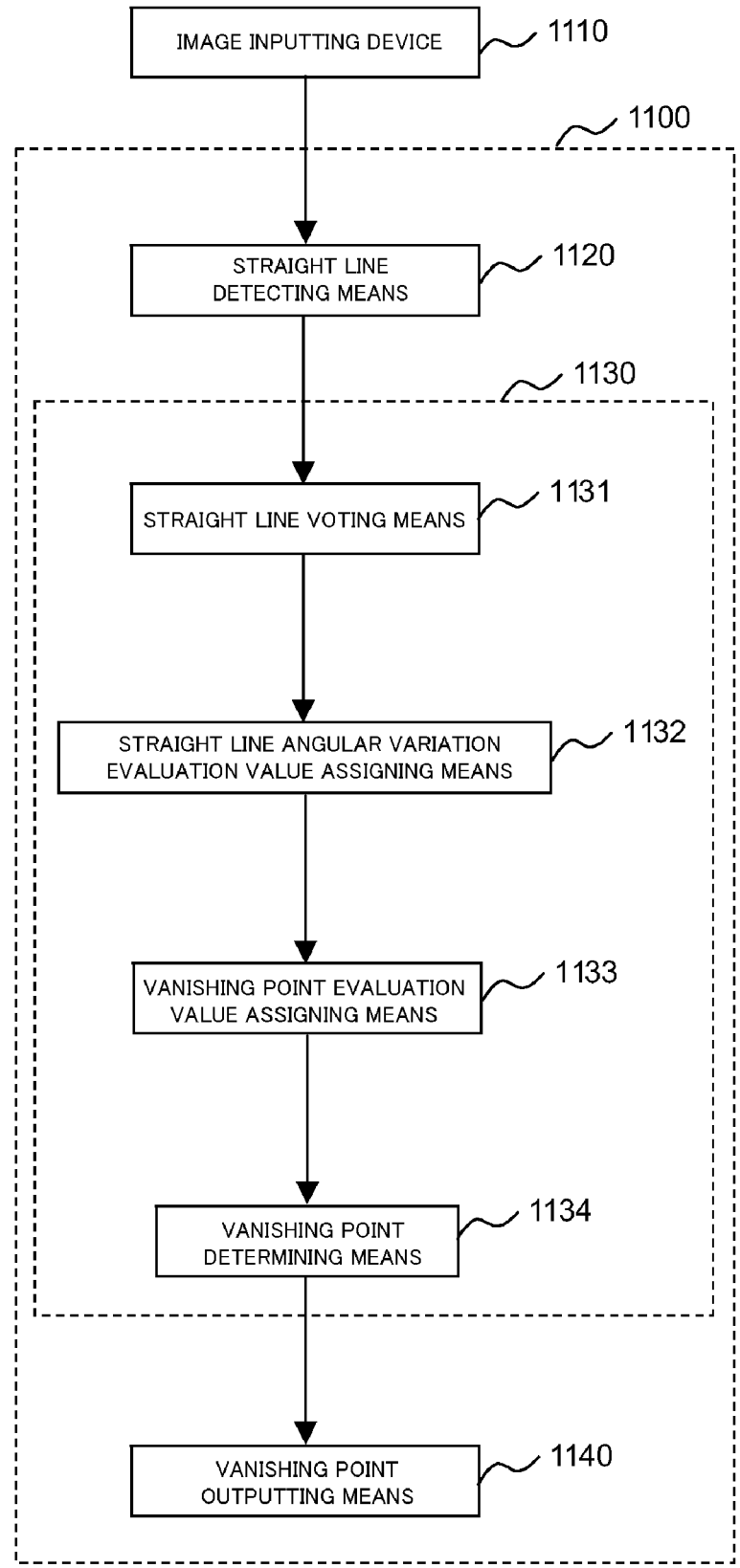
FIG. 11 is a diagram showing a configuration of a second exemplary embodiment of the present invention.

FIG. 11 is a diagram showing a configuration of the second exemplary embodiment of the present invention.

Referring to FIG. 11, the second exemplary embodiment of the invention is configured by being provided with a computer (central processing unit, processor, and data processing unit) 1100 that operates by program control, and an image inputting device 1110.

The computer (central processing unit, processor, or data processing unit) 1100 includes a straight line detecting means (unit) 1120, a vanishing point detecting means (unit) 1130, and a vanishing point outputting means (unit) 1140.

The vanishing point detecting means 1130 includes a straight line voting means (unit) 1131, a straight line angular variation evaluation value assigning means (unit) 1132, a vanishing point evaluation value assigning means (unit) 1133, and a vanishing point determining means (unit) 1134.

Each of these means operate in outline as follows.

The image inputting device 1110 inputs an image that is a target in which a vanishing point is detected.

The straight line detecting means 1120 detects plural straight lines that are presumed to pass through the vanishing point, from the image inputted by the image inputting device 1110.

The straight line voting means 1131, for each point in a two dimensional space (referred to below as "straight line voting space") that includes at least a portion of the image inputted by the image inputting device 1110, gives a voting value based on straight lines passing through the point or through a prescribed range surrounding the point among the plurality of straight lines detected by the straight line detecting means 1120.

The straight line angular variation evaluation value assigning means 1132 assigns, for each point in the straight line voting space, a straight line angular variation evaluation value that evaluates the extent of variation of the angles of the straight lines passing through the point or through a prescribed range surrounding the point, based on voting values in a vicinity of the point in question assigned by the straight line voting means 1131.

The vanishing point evaluation value assigning means 1133 assigns, for each point in the straight line voting space, a vanishing point evaluation value that evaluates vanishing point plausibility of the point from the angular variation evaluation values and the voting values, which are assigned to each point by the straight line voting means 1131.

The vanishing point evaluation value assigning means 1133 may be omitted, according to circumstances, and in such circumstances, the straight line variation evaluation value is used as the vanishing point evaluation value.

The vanishing point determining means 1134 determines the vanishing point, using the vanishing point evaluation values, which are assigned to each point in the image or the straight line voting space.

The vanishing point outputting means 1140 outputs the vanishing point determined by the vanishing point determining means 1134.

Figure 12:
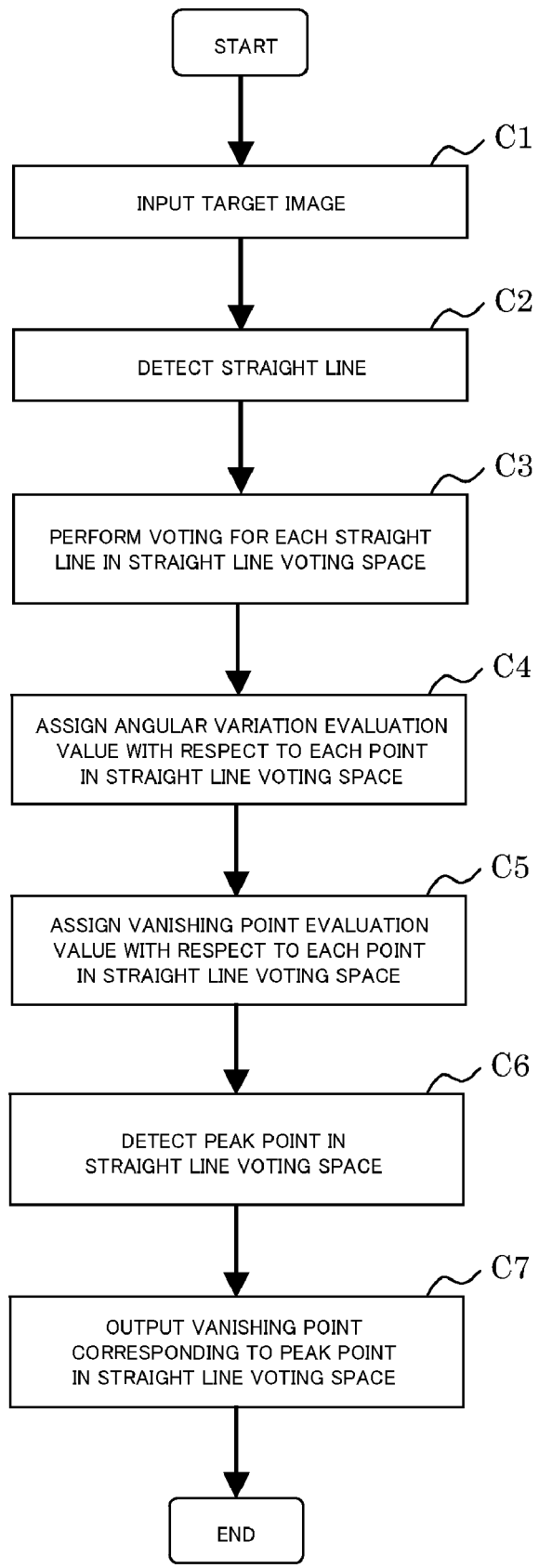
FIG. 12 is a flowchart for describing operation of the second exemplary embodiment of the present invention.

FIG. 12 is a flow chart describing operation of the present exemplary embodiment. Referring to FIG. 11 and FIG. 12, the overall operation of the present exemplary embodiment will be described in detail.

First, the image inputting device 1110 inputs an image that is a target for vanishing point detection (step C1 in FIG. 12).

Next, the straight line detecting means 1120 detects plural straight lines that are presumed to pass through the vanishing point, from the image inputted by the image inputting device 1110.

The straight line voting means 1131 performs voting for straight lines detected in step C2 in the straight line voting space (step C3).

The straight line angular variation evaluation value assigning means 1132 assigns, for each point in the straight line voting space, a straight line angular variation evaluation value for the plural straight lines that pass through the point or through a prescribed range surrounding the point, based on voting values in the vicinity of the point in question assigned in step C3.

The vanishing point evaluation value assigning means 1133 assigns, for each point in the image or in the straight line voting space, a vanishing point evaluation value from the straight line angular variation evaluation value and the voting value assigned to each point in step C3 (step C5).

Step C5 may be omitted, and the straight line angular variation evaluation value may be used as the vanishing point evaluation value.

The vanishing point determining means 1134 uses the vanishing point evaluation value assigned to each point in the straight line voting space, to have, as the vanishing point, a point assigned the maximum vanishing point evaluation value, for example, and detects the vanishing point (step C6).

A vanishing point detection method using the vanishing point evaluation value is not limited to this, and it is possible also to detect a vanishing point by having a point to which the maximum value among the vanishing point evaluation values is given, for example, as the vanishing point.

The vanishing point detected by the vanishing point outputting means 1140 is outputted (step C7).

Next, an operational effect of the second exemplary embodiment of the present invention will be described.

The present exemplary embodiment is configured such that the straight line angular variation evaluation values are calculated based on vicinity voting values in the straight line voting space, so that it is possible to calculate the straight line angular variation evaluation values with a small amount of processing, and it is possible to perform robust vanishing point detection with regard to false straight lines in a short processing time.

Next, a description will be given according to a specific example.

EXAMPLE 2

The present example detects, as straight lines, edge portions such as white lines 412 representing driving lanes, and road edges 413, by a Hough transform, from a road image 410 (an image taken of the road ahead from an in-vehicle camera), as shown in FIG. 4, and detects a vanishing point formed by these.

Figure 13:
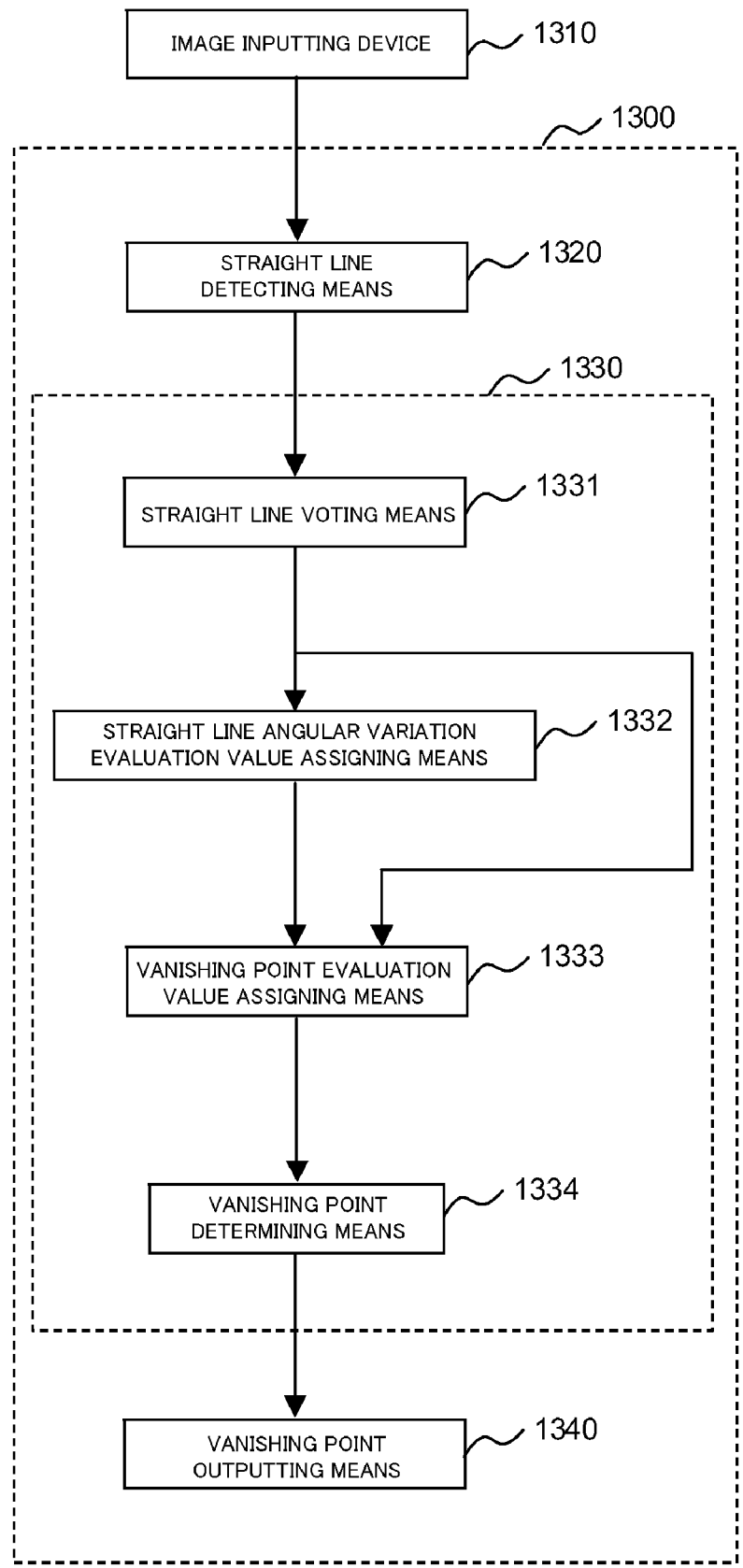
FIG. 13 is a diagram showing a configuration of a second example of the present invention.

As shown in FIG. 13, the present example includes an image inputting device 1310 that includes an in-vehicle camera, a straight line detecting means (unit) 1320, a vanishing point detecting means (unit) 1330, and a vanishing point outputting means (unit) 1340.

The vanishing point detecting means 1330 includes a straight line voting means (unit) 1331, a straight line angular variation evaluation value assigning means (unit) 1332, a vanishing point evaluation value assigning means (unit) 1333, and a vanishing point determining means (unit) 1334.

Figure 14A:
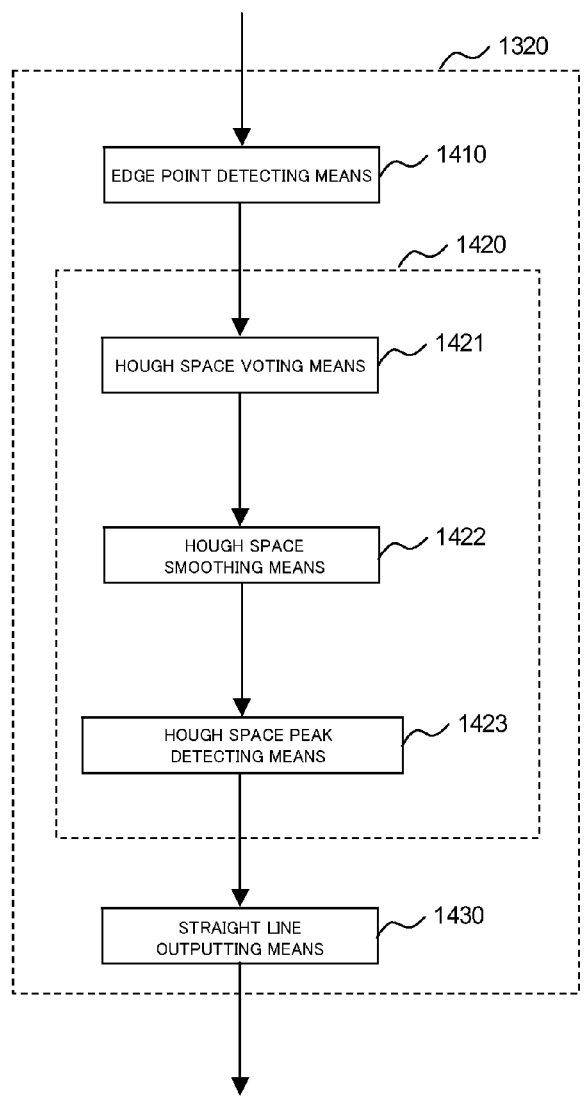
FIGS. 14A and 14B are diagrams showing configurations of the second example of the present invention.
Figure 14B:
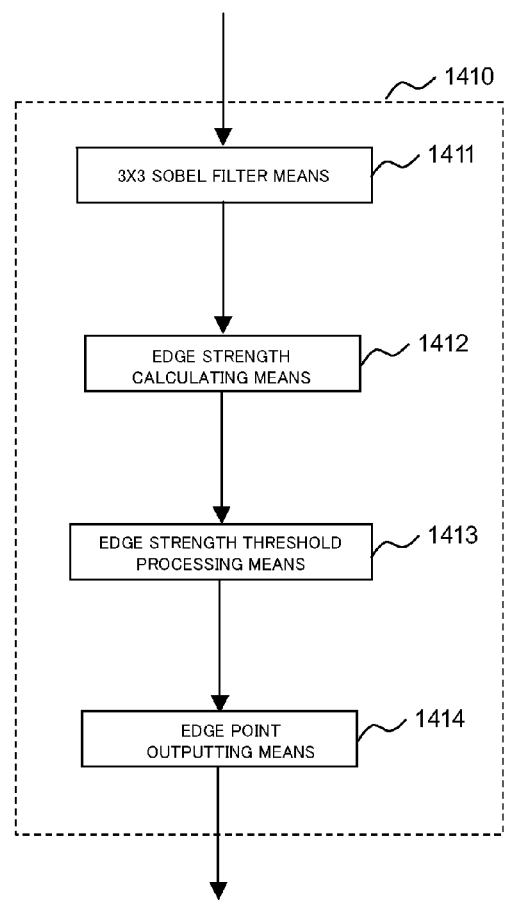

FIG. 14A is a diagram showing a configuration of the straight line detecting means of FIG. 13. FIG. 14B is a diagram showing a configuration of an edge point detecting means 1410 of FIG. 14A. As shown in FIG. 14A, the straight line detecting means 1320 includes the edge point detecting means(unit) 1410, a Hough transform means (unit) 1420, and a straight line outputting means (unit) 1430.

As shown in FIG. 14B, the edge point detecting means 1410 includes a 3×3 Sobel filter means (unit) 1411, an edge strength calculating means (unit) 1412, an edge strength threshold processing means (unit) 1413, and an edge point outputting means (unit) 1414. The edge point detecting means 1410 is not limited to this configuration, and may be any means that detects points of an edge portion (referred to below as "edge points") at which there is a steep change of pixel values.

As shown in FIG. 14A, the Hough transform means 1420 includes a Hough space voting means 1421, a Hough space smoothing means 1422, and a Hough space peak detecting means 1423.

The image inputting device 1310 of FIG. 13 inputs the road image 410 (refer to FIG. 4).

The straight line detecting means 1320 detects, as straight lines, edge portions such as the white lines 412 representing driving lanes, the road edges 413, and the like, by the Hough transform, from the road image 410 (refer to FIG. 4).

The vanishing point detecting means 1330 of FIG. 13 detects, as a vanishing point, a point at which straight lines detected by the straight line detecting means 1320 converge.

The vanishing point outputting means 1340 of FIG. 13 outputs the vanishing point.

The 3×3 Sobel filter means 1411 of FIG. 14B obtains the sum of the product of each coefficient of an x-direction gradient kernel 801 and a y-direction gradient kernel 802 shown in FIG. 8A and FIG. 8B, and each pixel value in a 3×3 vicinity for each point in the road image 410 (refer to FIG. 4). The product sums of these are respectively referred to as "Sobel x-component" and "Sobel y-component".

The edge strength calculating means 1412 of FIG. 14B calculates the square of the sum of squares or sum of absolute values of the Sobel x-component and the Sobel y-component, for each point in the road image 410 (refer to FIG. 4), and obtains the edge strength of each point.

The edge strength threshold processing means 1413 of FIG. 14B determines whether or not the edge strength for each point in the road image 410 (refer to FIG. 4) is greater than or equal to a threshold determined in advance, for example, 100.

The edge point outputting means 1414 of FIG. 14B outputs, as an edge point, a point at which the edge strength is determined to be greater than or equal to the threshold by the edge strength threshold processing means 1413.

The Hough space voting means 1412 of FIG. 14A votes for a weighting according to the edge point, for each point on a track corresponding to edge points detected by the edge point detecting means 1410, in a space (referred to below as a Hough space) that has parameters, which represent straight lines, as axes.

Here, voting takes place for the edge strength as the weighting according to the edge point. The weighting corresponding to the edge point is not limited to this, and as described above, for example, a constant, an angle formed by a gradient of pixel values for edge points calculated from the Sobel x-component and the Sobel y-component, described later, and a gradient of a straight line corresponding to points on the track, a value calculated from pixel values or the like of edge points or a vicinity thereof, or a value calculated from these values or edge strength or the like, may be used.

The Hough space smoothing means 1422 of FIG. 14A uses, for each point in the Hough space, a voting value (referred to below as a "straight line voting value") of the point or a point in a vicinity thereof, and determines a straight line voting value that has been smoothed at the point.

Here, for example, the straight line voting value that has been smoothed is determined as an average value of points in a 3×3 vicinity of the point. The method of determining a vicinity range or the straight line voting value that has been smoothed is not limited to this. In addition, according to circumstances, the Hough space smoothing means 1422 of FIG. 14A may be omitted.

The Hough space peak detecting means 1423 of FIG. 14A detects, as a peak, a point with a value that is greater than or equal to the threshold determined in advance in the Hough space, and that has a maximum straight line voting value in the 3×3 vicinity range or the like, for example. However, a reference for detecting the peak is not limited to this, and a reference corresponding to a problem setting is possible, such as taking, as a peak, only a point having the maximum straight line voting value in the Hough space.

The straight line voting means 1331 of FIG. 13 makes a vote (referred to below as "vanishing point voting value") of a straight line voting value for a peak detected by the Hough space peak detecting means 1423 of FIG. 14A, for example, for a point in the straight line voting space corresponding to a point on the track of each straight line detected by the Hough transform means 1420 of FIG. 14A. However, the voting value is not limited to this, and a voting value may be used such that the more plausible it is that a point is on the straight line, the larger its value is.

The straight line angular variation evaluation value assigning means 1332 of FIG. 13 calculates and assigns a straight line angular variation evaluation value based on a vanishing point voting value in a vicinity of each point in the straight line voting space.

The vanishing point evaluation value assigning means 1333 of FIG. 13 calculates and assigns, for each point in the straight line voting space, a vanishing point evaluation value from a vanishing point voting value of the point or a vicinity thereof, and a straight line angular variation evaluation value.

The vanishing point determining means 1334 of FIG. 13 determines, as the vanishing point, a point at which the vanishing point evaluation value is at a maximum in the straight line voting space, for example. However, a reference for the vanishing point determination is not limited to this, and the reference can be taken in according with problem setting, such as a point having a vanishing point evaluation value greater than or equal to a threshold determined in advance, or a point having a maximum value in a vicinity determined in advance, or a combination of these conditions.

The straight line angular variation evaluation value will be described in the below.

As described above, the straight line angular variation evaluation value is calculated such that the more dispersed the angles of the straight lines passing through the point in question or a prescribed range surrounding the point in question are, the large its value is.

Figure 15:
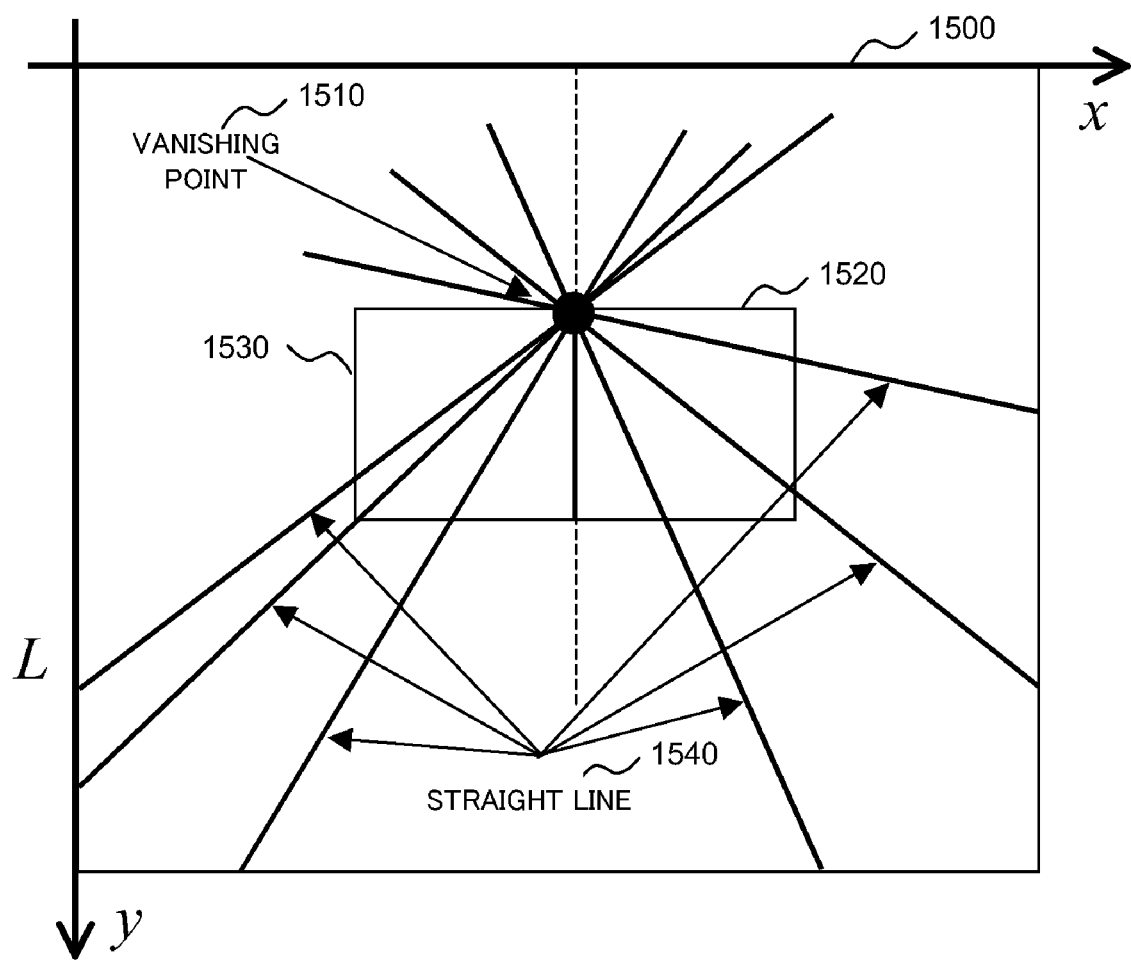
FIG. 15 is a diagram showing one example of variance of vanishing point voting values in a region to the right bottom and a region to the left bottom of a vicinity of a vanishing point.

Here, as shown in FIG. 15 in particular, with regard to the significance of the straight lines passing through a region 1520 to the right bottom of a vanishing point 1510 and straight lines passing through a region 1530 to the left bottom being present without having a bias, assuming a case in which it can be supposed that the variation of the straight line angles with respect to the vanishing point 1510 is large. This type of situation is applicable to a case in which a road image as in the present example is a target, as an image 1500.

Consequently, in the present embodiment, at each point in the straight line voting space, calculation of the straight line angular variation evaluation values is performed as below, based on the vanishing point voting values in the vicinity of the point.

Figure 16:
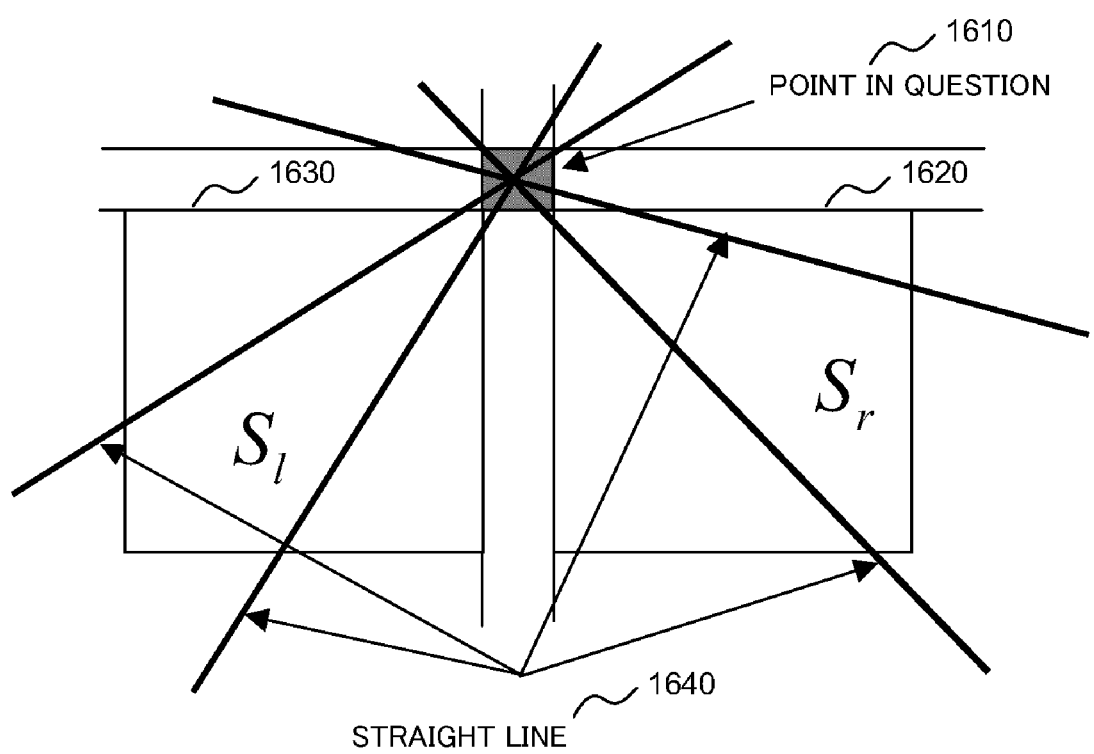
FIG. 16 is a diagram describing a straight line angular variation evaluation value in the second example of the present invention.

That is, as shown in FIG. 16, assuming that the sum of vanishing point voting values in a region 1620 to the right bottom of a point in question 1610 is Sr, and the sum of vanishing point voting values in a region 1630 to the left bottom is Sl, a calculation is made as in equation (5).

$$\frac{2 \cdot \min(S_r, S_l)}{S_r + S_l} \tag{5}$$

However, the calculation of the straight line angular variation evaluation value is not limited to equation (5), and the other equations can be used such that values become large when the vanishing point voting values in the region 1620 to the right bottom of the point in question 1610 of FIG. 16 and the vanishing point voting values in the region 1630 to the left bottom are present without bias.

It is possible to take a square region or the like of size 13×13, for example, as the region 1620 to the right bottom and the region 1630 to the left bottom. However, these are not limited thereto, and it is possible to take regions according to application.

Figure 17:
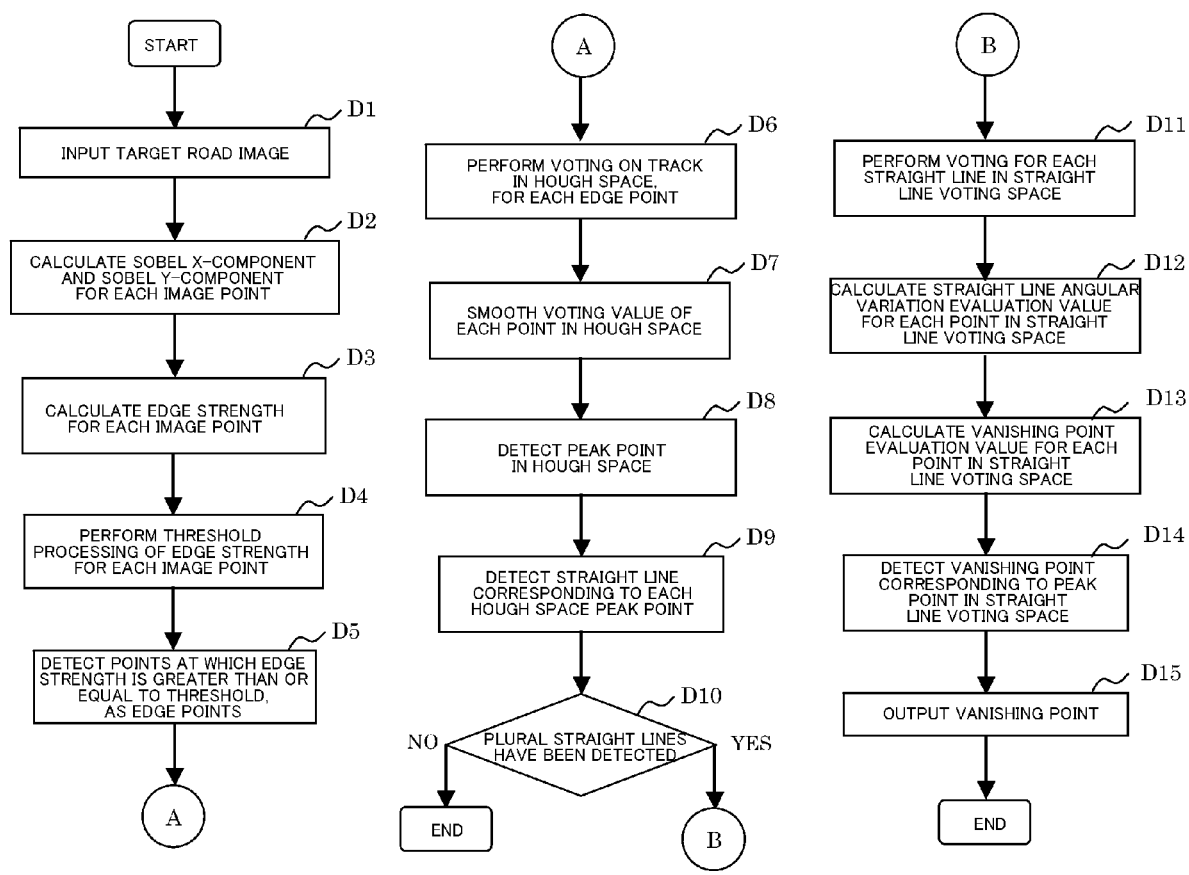
FIG. 17 is a flowchart for describing operation of the second example of the present invention.
Figure 18:
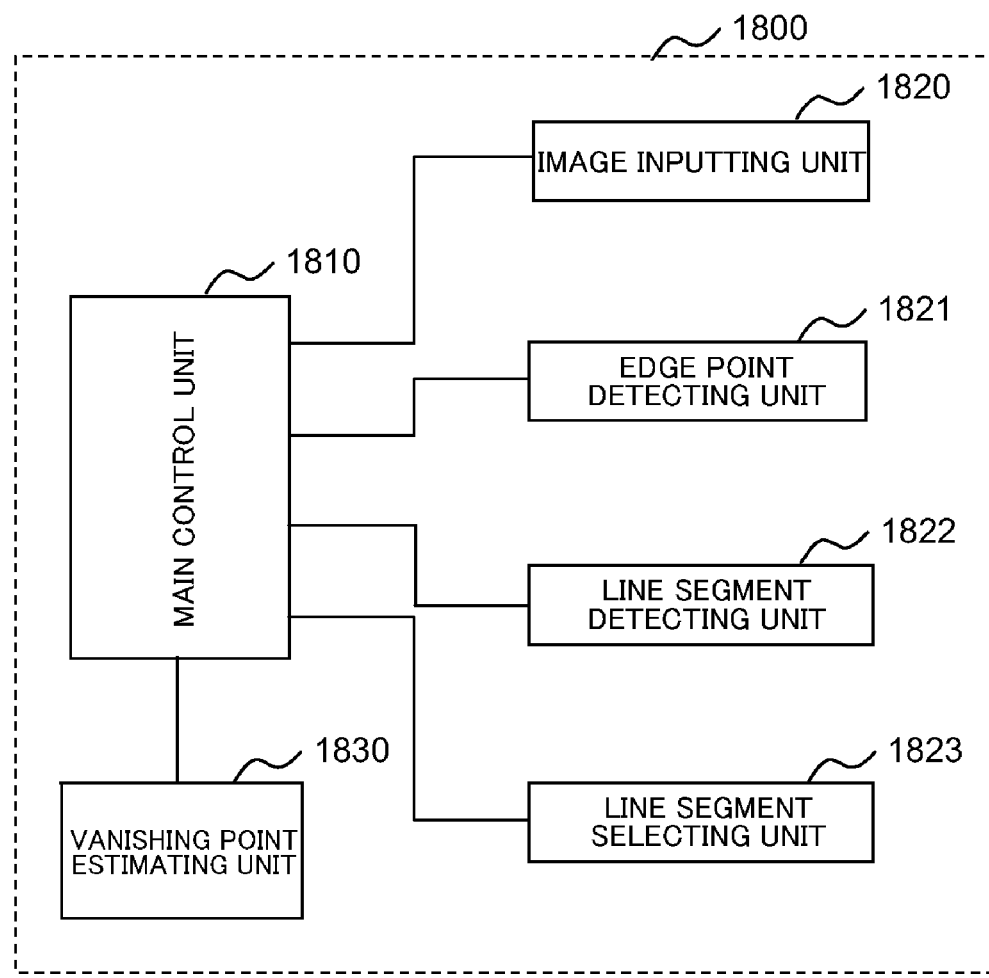
FIG. 18 is a diagram showing a configuration of a conventional system.
Figure 19:
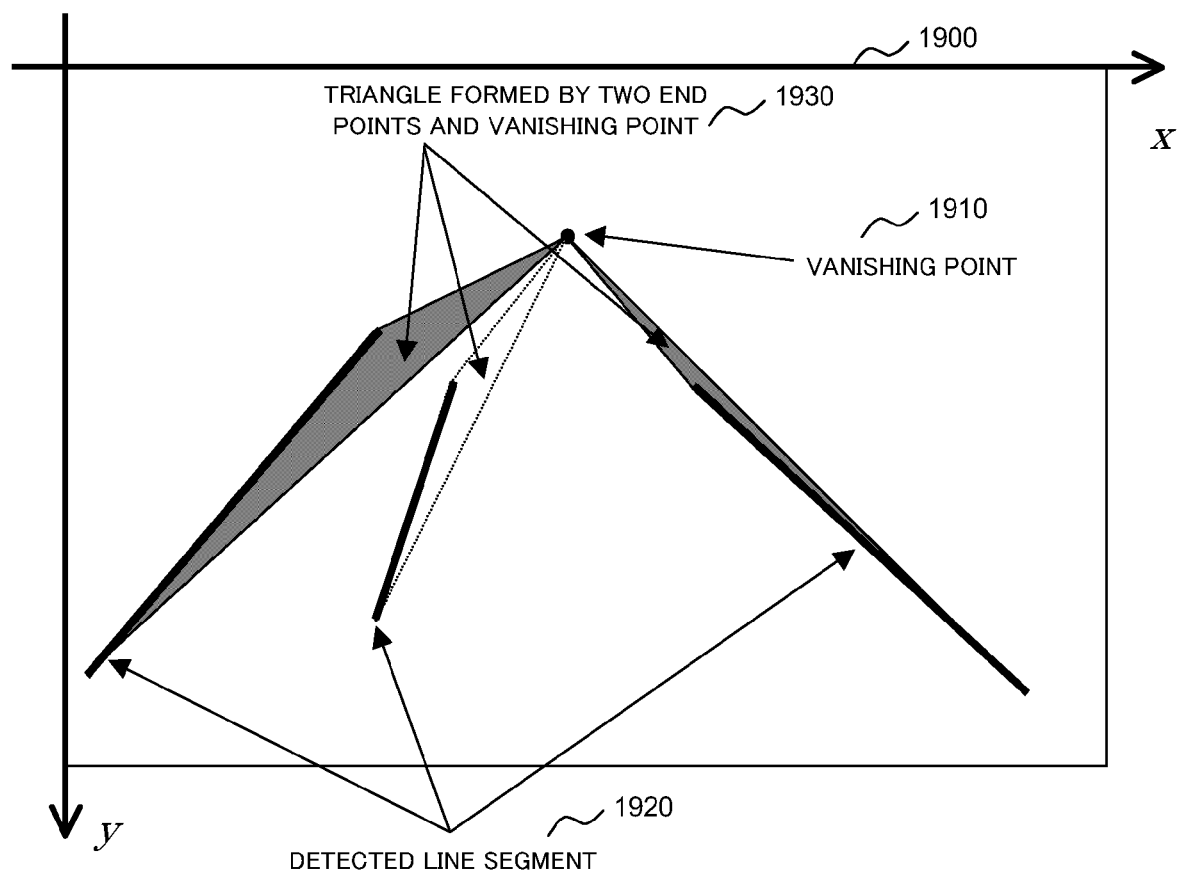
FIG. 19 is a diagram describing a vanishing point estimating unit in the conventional system.
Figure 20:
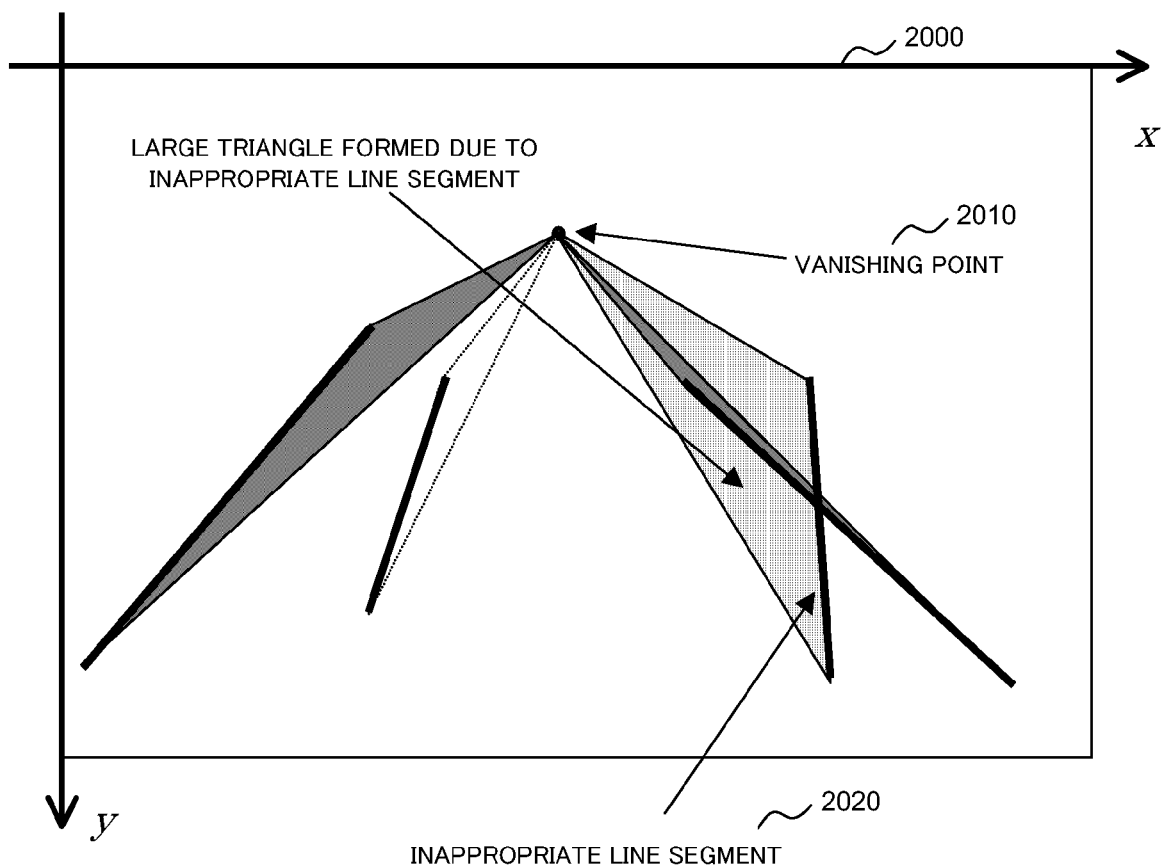
FIG. 20 is a diagram showing an example of failure of vanishing point estimation in the conventional system.

FIG. 17 is a flow chart describing operation of the present example. Operation of the present example is described in detail, making reference to FIG. 13, FIG. 14, and FIG. 17.

First, the image inputting device 1310 of FIG. 13 inputs a road image (step D1 in FIG. 17).

Next, the 3×3 Sobel filter means 1411 of FIG. 14B calculates the Sobel x-component and the Sobel y-component for each point in the road image 410 (refer to FIG. 4) (step D2).

Next, the edge strength calculating means 1412 of FIG. 14B calculates the edge strength of each point in the road image (step D3).

Next, the edge strength threshold processing means 1413 of FIG. 14B performs threshold processing of edge strength for each point in the road image (step D4).

Next, the edge point outputting means 1414 of FIG. 14B detects, as an edge point, a point for which the edge strength is greater than or equal to a threshold (step D5).

Next, the Hough space voting means 1421 of FIG. 14A performs voting on a track in the Hough space for each edge point (step D6).

Next, the Hough space smoothing means 1422 of FIG. 14A smoothes a voting value of each point in the Hough space (step D7).

Next, the Hough space peak detecting means 1423 of FIG. 14A detects a peak point in the Hough space (step D8).

Next, the straight line outputting means 1430 of FIG. 14A detects a straight line corresponding to each Hough space peak point (step D9).

Here, if plural straight lines are detected, flow proceeds to step D11, and if plural straight lines are not detected, the flow ends (step D10).

Next, the straight line voting means 1331 of FIG. 13 makes a vote of a straight line voting value for a peak detected by the Hough space peak detecting means 1423 of FIG. 14 (A), for example, for a point in the straight line voting space corresponding to a point on the track of each straight line detected by the Hough transform means 1420 of FIG. 14A (step D11).

Next, the straight line angular variation evaluation value assigning means 1332 of FIG. 13 calculates a straight line angular variation evaluation value based on a vanishing point voting value in a vicinity of the point in question, for each point in the straight line voting space (step D12).

Next, the vanishing point evaluation value assigning means 1333 of FIG. 13 calculates a vanishing point evaluation value for each point of the straight line voting space as, for example, the product of the vanishing point voting value and the straight line angular variation evaluation value (step D13).

Next, the vanishing point determining means 1334 of FIG. 13 detects a vanishing point corresponding to a peak point of the vanishing point voting values in the straight line voting space (step D14).

Next, the vanishing point outputting means 1340 of FIG. 13 outputs a vanishing point that was detected (step D15).

The present invention can be applied to any usage in which detection of a vanishing point outside of a point at infinity, from an image, is performed. The present invention has been described above according to the abovementioned examples, but the present invention is not limited to only configurations of the abovementioned examples, and clearly includes every type of transformation and modification that a person skilled in the art can realize within the scope of the present invention.

The invention claimed is:

1. A vanishing point detecting system comprising:
 a straight line detecting unit that detects a straight line from an image;
 a straight line angular variation evaluation value assigning unit that assigns, for each point in a space including at least a portion of the image, when angles of straight lines that pass through the point or through a prescribed range surrounding the point are sparsely distributed over a relatively wide range, a straight line angular variation evaluation value having a larger value; and
 a vanishing point detecting unit that, using, as a vanishing point evaluation value, the straight line angular variation evaluation value, detects, as a vanishing point, a point at which the straight line angular variation evaluation value has a relatively large value in comparison with other points.

2. The vanishing point detecting system according to claim 1, wherein the straight line angular variation evaluation value assigning unit calculates, with regard to a point through which a plurality of straight lines pass or a vicinity of a point through which a plurality of straight lines pass, in the image, the straight line angular variation evaluation value, as an evaluation value which represents extent of variation of angles of the straight lines, and
 the vanishing point detecting unit detects, as a vanishing point, a point at which, using a straight line angular variation evaluation value that is derived corresponding to a point through which a plurality of straight lines pass or a vicinity of the point through which the plurality of straight lines pass, as an index of vanishing point plausibility, the straight line angular variation evaluation value has a relatively large value in comparison with straight line angular variation evaluation values derived for other points.

3. The vanishing point detecting system according to claim 1, wherein the straight line detecting unit detects a straight line by a Hough transform, and uses a voting value of the Hough transform of the straight line as a confidence factor for the straight line.

4. The vanishing point detecting system according to claim 1, wherein a statistical value concerning the angles of the straight lines is used as the straight line angular variation evaluation value.

5. A vanishing point detecting system comprising:
 a straight line detecting unit that detects a straight line from an image;
 a straight line angular variation evaluation value assigning unit that assigns, for each point in a space including at least a portion of the image, when angles of straight lines that pass through the point or through a prescribed range surrounding the point are sparsely distributed over a relatively wide range, a straight line angular variation evaluation value having a larger value; and
 a vanishing point detecting unit that, using, as a vanishing point evaluation value, the straight line angular variation evaluation value, detects, as a vanishing point, a point at which the straight line angular variation evaluation value has a relatively large value in comparison with other points,
 wherein a statistical value concerning the angles of the straight lines is used as the straight line angular variation evaluation value, wherein the statistical value concerning the angles of the straight lines includes at least one of: variance, standard deviation, difference between maximum value and minimum value and ratio of maximum value and minimum value, of the angles of the straight lines.

6. The vanishing point detecting system according to claim 1, wherein a confidence factor bias for the straight lines between a right bottom region and a left bottom region of a point in question is used as the straight line angular variation evaluation value.

7. The vanishing point detecting system according to claim 1, wherein the image comprises image data obtained from an in-vehicle sensor, and
a vanishing point with regard to a lane marker representing a driving lane and/or a road edge is detected as the vanishing point.

8. A vehicle surrounding environment recognition system comprising the vanishing point detecting system according to claim 1, wherein a positional relationship between vehicle and surrounding environment is calculated, based on a position of the vanishing point.

9. The vehicle surrounding environment recognition system according to claim 8, wherein a pitch angle between a road surface and a direction in which the vehicle is heading is calculated, as a positional relationship of the vehicle and the surrounding environment.

10. A vanishing point detecting system comprising:
a straight line detecting unit that detects straight lines from an image and that assigns a confidence factor as a straight line to each of the straight lines detected;
a straight line angular variation evaluation value assigning unit that assigns, for each point in a space including at least a portion of the image, when angles of straight lines that pass through the point or through a prescribed range surrounding the point are sparsely distributed over a relatively wide range, a straight line angular variation evaluation value having a larger value;
a vanishing point evaluation value assigning unit that assigns a vanishing point evaluation value, for each point in a space including at least a portion of the image, the vanishing point evaluation value assigning unit when a relatively large number of straight lines pass, based on a confidence factor for straight lines passing through the point or through a prescribed range surrounding the point, assigning to the point the vanishing point evaluation value having a larger value; and
a vanishing point detecting unit that detects, as a vanishing point, a point at which the vanishing point evaluation value has a relatively large value; wherein the vanishing point evaluation value assigning unit, when calculating the vanishing point evaluation value, takes into account the straight line angular variation evaluation value.

11. A vanishing point detecting method comprising:
detecting a straight line from an image;
assigning, for each point in a space including at least a portion of the image, when angles of straight lines that pass to the point or to a prescribed range surrounding the point are sparsely distributed over a relatively wide range, a straight line angular variation evaluation value having a larger value; and
using the straight line angular variation evaluation value as a vanishing point evaluation value, and detecting, as a vanishing point, a point at which the straight line angular variation evaluation value has a relatively large value.

12. The vanishing point detecting method according to claim 11, wherein in detecting a straight line from the image, the straight line is detected by a Hough transform, and a voting value of the Hough transform for the straight line is used as a confidence factor for the straight line.

13. The vanishing point detecting method according to claim 11, wherein a statistical value concerning the angles of the straight lines is used as the straight line angular variation evaluation value.

14. The vanishing point detecting method according to claim 11, wherein a confidence factor bias for the straight lines between a right bottom region and a left bottom region of a point in question is used as the straight line angular variation evaluation value.

15. The vanishing point detecting method according to claim 11, wherein image data obtained from an in-vehicle sensor is used as the image, and a vanishing point with regard to a lane marker representing a driving lane and/or a road edge is detected as the vanishing point.

16. A vehicle surrounding environment recognition method that calculates a positional relationship between a vehicle and surrounding environment, based on a position of the vanishing point obtained by the vanishing point detecting method according to claim 11.

17. The vehicle surrounding environment recognition method according to claim 16, wherein a pitch angle between a road surface and a direction in which the vehicle is heading is calculated, as a positional relationship of the vehicle and the surrounding environment.

18. A vanishing point detecting method comprising:
detecting a straight line from an image together with a confidence factor as a straight line;
assigning, for each point in a space including at least a portion of the image, when angles of straight lines that pass to the point or to a prescribed range surrounding the point are sparsely distributed over a relatively wide range, a straight line angular variation evaluation value having a larger value;
assigning, for each point in a space including at least a portion of the image, when a relatively large number of straight lines pass, based on a confidence factor for straight lines that pass to the point or to a prescribed range surrounding the point, a vanishing point evaluation value having a larger value; and
detecting, as a vanishing point, a point at which the vanishing point evaluation value has a relatively large value;
wherein, when calculating the vanishing point evaluation value, the straight line angular variation evaluation value is taken into account.

19. A vanishing point detecting method detecting a straight line from an image;
assigning, for each point in a space including at least a portion of the image, when angles of straight lines that pass to the point or to a prescribed range surrounding the point are sparsely distributed over a relatively wide range, a straight line angular variation evaluation value having a larger value; and
using the straight line angular variation evaluation value as a vanishing point evaluation value, and detecting, as a vanishing point, a point at which the straight line angular variation evaluation value has a relatively large value,
wherein a statistical value concerning the angles of the straight lines is used as the straight line angular variation evaluation value, wherein a statistical value concerning the angles of the straight lines includes at least one of: variance, standard deviation, difference between maximum value and minimum value and ratio of maximum value and minimum value, of the angles of the straight lines.

20. A non-transitory computer readable medium with an executable program thereon, the program for causing a computer which detects a vanishing point to execute the processing comprising:
detecting a straight line from an image;
assigning, for each point in a space including at least a portion of the image, when angles of straight lines that pass to the point or to a prescribed range surrounding the point are sparsely distributed over a relatively wide range, a straight line angular variation evaluation value having a larger value; and using the straight line angular variation evaluation value as a vanishing point evaluation value, and detecting, as a vanishing point, a point at which the straight line angular variation evaluation value has a relatively large value.

21. The non-transitory computer readable medium according to claim 20, the program causing the computer to execute the processing comprising:

detecting a straight line from an image together with a confidence factor as a straight line;

assigning, for each point in a space including at least a portion of the image, when angles of straight lines that pass to the point or to a prescribed range surrounding the point are sparsely distributed over a relatively wide range, a straight line angular variation evaluation value having a larger value;

assigning, for each point in a space including at least a portion of the image, a vanishing point evaluation value having a larger value than a case in which a relatively large number of straight lines pass, based on a confidence factor of straight lines that pass to the point or to a prescribed range surrounding the point, and at this occasion, of taking into account the straight line angular variation evaluation value, to calculate the vanishing point evaluation value; and detecting, as a vanishing point, a point at which the vanishing point evaluation value has a relatively large value.

22. The non-transitory computer readable medium according to claim 20, wherein in the straight line detecting processing, a straight line is detected by a Hough transform, and a voting value of the Hough transform for the straight line is used as a confidence factor for the straight line.

23. The non-transitory computer readable medium according to claim 20, wherein a statistical value concerning the angles of the straight lines is used as the straight line angular variation evaluation value.

24. The non-transitory computer readable medium according to claim 20, wherein a confidence factor bias for the straight lines between a right bottom region and a left bottom region of a point in question is used as the straight line angular variation evaluation value.

25. The non-transitory computer readable medium according to claim 20, the program causing the computer to execute a processing comprising:

using data obtained from an in-vehicle sensor as the image, and of detecting a vanishing point, with regard to a lane marker representing a driving lane and/or a road edge, as the vanishing point.

26. The non-transitory computer readable medium according to claim 20, the program causing the computer to execute the processing comprising:

calculating a positional relationship of a vehicle and surrounding environment, based on a position of the vanishing point that has been derived, and performing recognition of the surrounding environment of the vehicle.

27. The non-transitory computer readable medium according to claim 24, causing the computer to execute the processing comprising:

calculating a pitch angle between a road surface and a direction in which a vehicle is headed, as a positional relationship of the vehicle and the surrounding environment.

28. A non-transitory computer readable medium with an executable program thereon, the program for causing a computer which detects a vanishing point to execute the processing comprising:

detecting a straight line from an image;

assigning, for each point in a space including at least a portion of the image, when angles of straight lines that pass to the point or to a prescribed range surrounding the point are sparsely distributed over a relatively wide range, a straight line angular variation evaluation value having a larger value; and using the straight line angular variation evaluation value as a vanishing point evaluation value, and detecting, as a vanishing point, a point at which the straight line angular variation evaluation value has a relatively large value, wherein a statistical value concerning the angles of the straight lines is used as the straight line angular variation evaluation value, wherein the statistical value concerning the angles of the straight lines includes at least one of: variance, standard deviation, difference between maximum value and minimum value and ratio of maximum value and minimum value, of the angles of the straight lines.

* * * * *